(12) United States Patent
Saarenvirta

(10) Patent No.: US 10,621,533 B2
(45) Date of Patent: Apr. 14, 2020

(54) SYSTEM AND METHOD FOR OPERATING AN ENTERPRISE ON AN AUTONOMOUS BASIS

(71) Applicant: DAISY INTELLIGENCE CORPORATION, Toronto (CA)

(72) Inventor: Kari Saarenvirta, Toronto (CA)

(73) Assignee: DAISY INTELLIGENCE CORPORATION, Toronto, Ontario (CA)

( * ) Notice: Subject to any disclaimer, the term of this patent is extended or adjusted under 35 U.S.C. 154(b) by 159 days.

(21) Appl. No.: 15/872,530

(22) Filed: Jan. 16, 2018

(65) Prior Publication Data

US 2019/0220793 A1 Jul. 18, 2019

(51) Int. Cl.
 *G06Q 10/06* (2012.01)

(52) U.S. Cl.
 CPC ..... *G06Q 10/06375* (2013.01); *G06Q 10/067* (2013.01); *G06Q 10/06313* (2013.01); *G06Q 10/06393* (2013.01)

(58) Field of Classification Search
 None
 See application file for complete search history.

(56) References Cited

U.S. PATENT DOCUMENTS

| | | |
|---|---|---|
| 5,953,707 A | 9/1999 | Huang et al. |
| 6,029,139 A | 2/2000 | Cunningham et al. |
| 6,366,890 B1 | 4/2002 | Usrey |
| 6,892,376 B2 * | 5/2005 | McDonald ........... G06Q 10/103 707/E17.005 |
| 6,910,017 B1 | 6/2005 | Woo et al. |
| 7,024,592 B1 * | 4/2006 | Voas ................... G06F 11/3672 714/47.3 |

(Continued)

OTHER PUBLICATIONS

Saarenvirta, Kari Tapio, Evaluation of turbulence models for internal flows. 0258-0258, 2003 (Year: 2003).*

(Continued)

*Primary Examiner* — Octavian Rotaru
(74) *Attorney, Agent, or Firm* — Bereskin & Parr LLP/S.E.N.C.R.L., s.r.l.; Isis E. Caulder

(57) ABSTRACT

A computer system and computer-implemented method for autonomous enterprise planning for instance in a retail enterprise comprising retail planning processes such as assortment planning, regular price planning, promotional product planning, promotional pricing, inventory allocation, size/pack optimization, markdown pricing, or in an insurance enterprise comprising insurance underwriting, adjudication, fraud detection and subrogation. The computer system can comprise a data input module configured to input sensory data from an enterprise computer system, a data processor module configured to pre-process said inputted sensory data and generate pre-processed sensory data, a data storage module configured to store the inputted sensory data and the pre-processed sensory data, a calculation module configured to execute an enterprise state model and generate an optimized output for the enterprise process based on the inputted sensory data, a plurality of agent modules configured to execute a sub-process associated with the enterprise process and generate a sub-process decision output.

4 Claims, 21 Drawing Sheets

(56) References Cited

U.S. PATENT DOCUMENTS

| | | |
|---|---|---|
| 7,069,560 B1* | 6/2006 | Cheyer .................. G06F 9/465 719/317 |
| 7,130,811 B1 | 10/2006 | Delurgio et al. |
| 7,249,031 B2 | 7/2007 | Close et al. |
| 7,249,032 B1 | 7/2007 | Close et al. |
| 7,249,033 B1 | 7/2007 | Close et al. |
| 7,302,410 B1 | 11/2007 | Venkatraman et al. |
| 7,379,890 B2 | 5/2008 | Myr et al. |
| 7,523,047 B1 | 4/2009 | Neal et al. |
| 7,672,866 B2 | 3/2010 | Venkatraman et al. |
| 7,752,067 B2 | 7/2010 | Fotteler et al. |
| 8,370,184 B2 | 2/2013 | Fotteler et al. |
| 8,370,185 B2 | 2/2013 | Fotteler et al. |
| 8,620,722 B2 | 12/2013 | Kettner et al. |
| 8,639,548 B2 | 1/2014 | Fotteler et al. |
| 10,074,142 B1 | 9/2018 | Rozenson |
| 2002/0147630 A1 | 10/2002 | Rose et al. |
| 2003/0229502 A1 | 12/2003 | Woo |
| 2004/0059549 A1 | 3/2004 | Kropaczek et al. |
| 2005/0125768 A1* | 6/2005 | Wong .................... G06Q 10/06 717/100 |
| 2005/0144218 A1* | 6/2005 | Heintz ................. G06F 9/4862 709/202 |
| 2005/0197882 A1 | 9/2005 | Fotteler et al. |
| 2005/0197886 A1 | 9/2005 | Veit |
| 2005/0197899 A1 | 9/2005 | Veit et al. |
| 2005/0197901 A1 | 9/2005 | Veit et al. |
| 2005/0197928 A1 | 9/2005 | Fotteler et al. |
| 2005/0234696 A1* | 10/2005 | North .................. G06F 17/5009 703/22 |
| 2005/0267807 A1* | 12/2005 | Bentley, III ........... G06Q 10/06 705/300 |
| 2005/0288993 A1 | 12/2005 | Weng et al. |
| 2006/0020866 A1* | 1/2006 | Lo ....................... G06F 11/0709 714/741 |
| 2006/0155660 A1* | 7/2006 | Koshizen ........... G05B 13/0265 706/18 |
| 2007/0143186 A1 | 6/2007 | Apple et al. |
| 2007/0192168 A1 | 8/2007 | Van Luchene |
| 2007/0294736 A1* | 12/2007 | Brady .................... G06Q 10/06 725/97 |
| 2008/0065476 A1 | 3/2008 | Klein et al. |
| 2008/0235076 A1 | 9/2008 | Cereghini et al. |
| 2009/0070129 A1 | 3/2009 | Inbar et al. |
| 2009/0249287 A1* | 10/2009 | Patrick ...................... G06F 8/24 717/107 |
| 2009/0259516 A1 | 10/2009 | Zeevi et al. |
| 2009/0327476 A1* | 12/2009 | Grell ...................... G06Q 40/00 709/224 |
| 2010/0100418 A1 | 4/2010 | Richter et al. |
| 2010/0205044 A1 | 8/2010 | Scheer |
| 2010/0318403 A1 | 12/2010 | Bottom |
| 2013/0145174 A1* | 6/2013 | Hallum .................. G06Q 10/10 713/189 |
| 2015/0242947 A1 | 8/2015 | Wilson et al. |
| 2015/0379510 A1* | 12/2015 | Smith ................ G06Q 20/3829 705/71 |
| 2017/0004430 A1* | 1/2017 | Auradkar ......... G06Q 10/06313 |
| 2017/0357563 A1* | 12/2017 | Shah ................ G06Q 10/0639 |
| 2019/0079958 A1* | 3/2019 | Bentley ..................... G06F 16/93 |
| 2019/0114655 A1 | 4/2019 | Saarenvirta |
| 2019/0197441 A1* | 6/2019 | Park ................... G06Q 10/0631 |
| 2019/0219993 A1* | 7/2019 | Jin ................... G05B 19/41875 |

OTHER PUBLICATIONS

Saarenvirta, Kari; System and Method for Retail Merchandise Planning; related U.S. Appl. No. 15/795,821, filed Oct. 27, 2017.
Non-final Office Action and Notice of References Cited dated Feb. 3, 2020 in related U.S. Appl. No. 15/795,821 (35 pages).

* cited by examiner

Hardware Architecture Components for Autonomous Enterprise Planning System

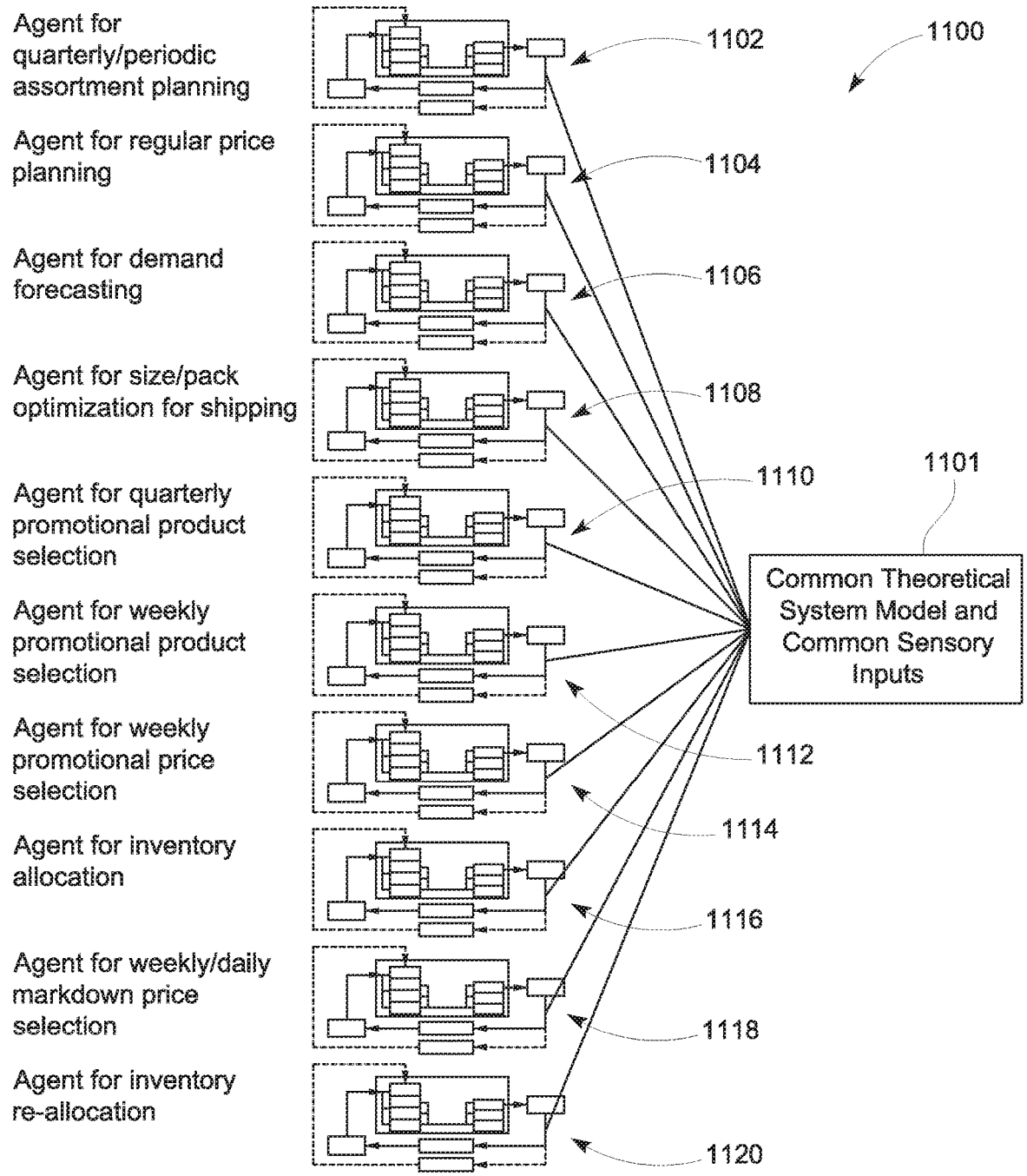

- If the aggregate effect on the enterprise of the autonomous planning agents is to be cumulatively positive then all agents must be contributing to a common goal
- Furthermore, the interaction effects between all agents must be accounted for between agents
- The interaction effects are reflected both in the common theoretical system model and the collaborative workflow between the agents
- Agents receive common sensory inputs from the external environment. Some agents also use the output of other agents as input

FIG. 11

- Statistical process control methods are used for sensory input data values, mathematical theory coefficients, derived features from sensory input data, actions collectively referred to as metrics.
- Upper and lower control limits are determined by executing the simulation loop and ensuring output actions fall within desired range of known historical action values.
- Warning levels are set inside the upper and lower control limits to aid in control monitoring.
- Confidence in system actions is based on the number and distribution of monitored metrics that fall within warning limits, between warning limit and control limit and outside control limits.

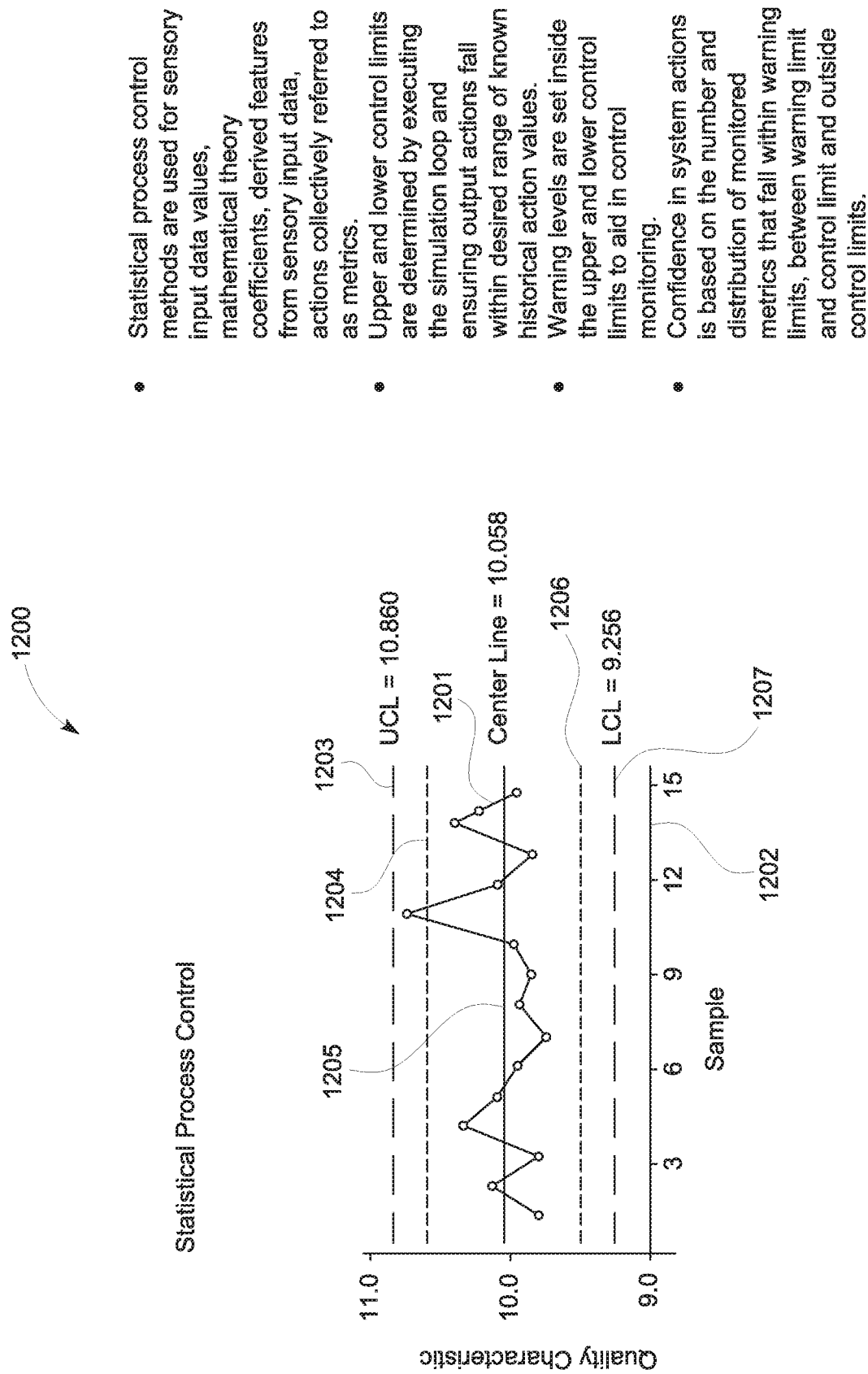

FIG. 12

| | Policy | Actual Claim Loss net of Subrogation Recoveries | Predicted Claim Loss net of Subrogation Recoveries | Feature #1 component of the mathematical theory | Feature #2 or component of the mathematical theory | ... | Feature #N or component of the mathematical theory |
|---|---|---|---|---|---|---|---|
| Header | | | | | | | |
| Data | 1 | $Y_1$ | $\hat{Y}_1$ | $X_{11}$ | $X_{12}$ | ... | $X_{1N}$ |
| | 2 | $Y_2$ | $\hat{Y}_2$ | $X_{21}$ | $X_{22}$ | ... | $X_{2N}$ |
| | 3 | $Y_3$ | $\hat{Y}_3$ | $X_{31}$ | $X_{32}$ | ... | $X_{3N}$ |
| | ... | ... | ... | ... | ... | ... | ... |
| | Z | $Y_Z$ | $\hat{Y}_Z$ | $X_{Z1}$ | $X_{Z2}$ | ... | $X_{ZN}$ |

1700

Period is typically a fiscal week although it could be of shorter or longer duration. There are Z periods of historical data in this example.
$Y_i$ represents the actual value of the claim loss from historical data for policy i
$\hat{Y}_i$ represents the predicted value of the claim loss for policy i using the historical data and features X
$X_{11}$ through $X_{ZN}$ represents the features and components in the mathematical theory equation 4

Data Set for Predictive Underwriting

FIG. 17

| Claim | Actual Subrogation Recovery | Predicted Subrogation Recovery | Feature #1 component of the mathematical theory | ... | Feature #2 or component of the mathematical theory | ... | Feature #N or component of the mathematical theory |
|---|---|---|---|---|---|---|---|
| 1 | $Y_1$ | $\hat{Y}_1$ | $X_{11}$ | ... | $X_{12}$ | ... | $X_{1N}$ |
| 2 | $Y_2$ | $\hat{Y}_2$ | $X_{21}$ | ... | $X_{22}$ | ... | $X_{2N}$ |
| 3 | $Y_3$ | $\hat{Y}_3$ | $X_{31}$ | ... | $X_{32}$ | ... | $X_{3N}$ |
| ... | ... | ... | ... | ... | ... | ... | ... |
| Z | $Y_Z$ | $\hat{Y}_Z$ | $X_{Z1}$ | ... | $X_{Z2}$ | ... | $X_{ZN}$ |

The data set represents Z claims processed over a time interval.
$Y_i$ represents the actual value of the subrogation recovery from historical data for claim i.
$\hat{Y}_i$ represents the predicted value of the subrogation recovery for claim i using the historical data and features $X_{i1}$ through $X_{ZN}$ represents the features and components in the mathematical theory equation 4

Data Set for Predictive subrogation

FIG. 18

| Claim | Actual Fraud Recovery | Predicted Fraud Recovery | Feature #1 component of the mathematical theory | Feature #2 or component of the mathematical theory | ... | Feature #N or component of the mathematical theory |
|---|---|---|---|---|---|---|
| 1 | $Y_1$ | $\hat{Y}_1$ | $X_{11}$ | $X_{12}$ | ... | $X_{1N}$ |
| 2 | $Y_2$ | $\hat{Y}_2$ | $X_{21}$ | $X_{22}$ | ... | $X_{2N}$ |
| 3 | $Y_3$ | $\hat{Y}_3$ | $X_{31}$ | $X_{32}$ | ... | $X_{3N}$ |
| ... | ... | | ... | ... | ... | ... |
| Z | $Y_Z$ | $\hat{Y}_Z$ | $X_{Z1}$ | $X_{Z2}$ | ... | $X_{ZN}$ |

The data set represents Z claims processed over a time interval.
$Y_i$ represents the actual value of the fraud recovery from historical data for claim i
$\hat{Y}_i$ represents the predicted value of the fraud recovery for claim i using the historical data and features X
$X_{i1}$ through $X_{ZN}$ represents the features and components in the mathematical theory equation 4

Data Set for Predictive Fraud Detection

FIG. 19

| Entity | Actual Fraud Recovery | Predicted Fraud Recovery | Feature #1 component of the mathematical theory | Feature #2 or component of the mathematical theory | ... | Feature #N or component of the mathematical theory |
|---|---|---|---|---|---|---|
| 1 | $Y_1$ | $\hat{Y}_1$ | $X_{11}$ | $X_{12}$ | ... | $X_{1N}$ |
| 2 | $Y_2$ | $\hat{Y}_2$ | $X_{21}$ | $X_{22}$ | ... | $X_{2N}$ |
| 3 | $Y_3$ | $\hat{Y}_3$ | $X_{31}$ | $X_{32}$ | ... | $X_{3N}$ |
| ... | ... | ... | ... | ... | ... | ... |
| Z | $Y_Z$ | $\hat{Y}_Z$ | $X_{Z1}$ | $X_{Z2}$ | ... | $X_{ZN}$ |

The data set represents Z entities aggregate claim and aggregate service delivery over a period of time
$Y_i$ represents the actual value of the fraud recovery from historical data for claim i
$\hat{Y}_i$ represents the predicted value of the fraud recovery for claim i using the historical data and features X
$X_{i1}$ through $X_{ZN}$ represents the features and components in the mathematical theory equation 4

Data Set for Entity Outlier Detection and Entity Fraud Prediction

FIG. 20

SYSTEM AND METHOD FOR OPERATING AN ENTERPRISE ON AN AUTONOMOUS BASIS

FIELD OF THE INVENTION

The present invention relates to computer systems and more particularly, to a system and method for operating an enterprise on an autonomous basis.

BACKGROUND OF THE INVENTION

In the art, enterprise operators do not typically employ sophisticated analysis to plan operational activity; such as planning promotions, price and inventory allocation in retail, investigating fraudulent claims or pricing policies in insurance, making medical diagnoses, forecasting demand or maintenance for manufacturing, optimizing plant capacity for manufacturing, for example. It is common that enterprises rely on human intuition to interpret overly simplified information to make operational decisions that impact the ultimate performance of enterprise.

Human operators are subject to various influences and effects, including, for instance: (1) personal experience bias, i.e. where personal experiences are not representative samples of the complete decision making experience; (2) fatigue from making a large number of repetitive decisions daily; (3) the need for variety in decision making when no variety necessarily exists; (4) inconsistency in making a decision under the similar or the same enterprise state or environment; (5) an inability to detect change or trends in the enterprise state or environment; (6) the inability to quality control the decisions made; (7) inability to make sense of the overwhelming amount of data generated by enterprise processes; (8) an inability to make decisions in very complex enterprise environments where many factors affect decision outcomes; (10) an inability of a single element of the planning process to take into account all of the interaction effects between all parts of the enterprise and its planning processes; (11) an inability to determine when a system becomes unstable; (12) an inability to detect when a system has had a failure or output has been corrupted. One or more of these factors can lead to sub-optimal enterprise financial and operational performance.

Accordingly, there remains a need for improvements in the art.

BRIEF SUMMARY OF THE INVENTION

The present invention is directed to a method and system for autonomously operating an enterprise and comprises decision making functionality for quantitative, mathematical, repetitive and complex operations in the enterprise.

According to one embodiment, the present invention comprises a computer system for autonomously executing operations and operations associated with a process for an enterprise, said computer system comprising: a data input module configured to input sensory data from an enterprise computer system, a data processor module configured to pre-process said inputted sensory data and generate pre-processed sensory data; a data storage module configured to store said inputted sensory data and said pre-processed sensory data; a calculation module configured to execute an enterprise state model and generate an optimized output for the enterprise process based on said inputted sensory data; a plurality of agent modules, each of said agent modules being configured to execute a sub-process associated with the enterprise process and generate a sub-process decision output; an output module configured to generate an electronic enterprise plan based on said optimized output and sub-process decision outputs.

According to another embodiment, the present invention comprises a computer-implemented method for autonomously executing operations and operations associated with a process for an enterprise, said computer-implemented method comprising: inputting sensory data from a computer system associated with the enterprise; storing said inputted sensory data in a data storage module; executing an enterprise state model to generate an optimized output for the enterprise process based on said inputted sensory data; utilizing a plurality of agent modules, each of said agent modules being configured to execute a sub-process associated with the enterprise process and generate a sub-process decision output; generating an electronic enterprise plan based on said optimized output and sub-process decision outputs.

Other aspects and features of the present invention will become apparent to those ordinarily skilled in the art upon review of the following description of embodiments of the invention in conjunction with the accompanying figures.

BRIEF DESCRIPTION OF THE DRAWINGS

Reference will now be made to the accompanying drawings which show, by way of example, embodiments of the present invention, and in which:

FIG. 11 shows in diagrammatic form a configuration for common components comprising mathematical theory modules and common external sensory input modules for the intelligent agent modules in a singular industry, according to an embodiment of the present invention;

FIG. 12 shows in diagrammatic form a statistical process control chart according to an embodiment of the present invention;

FIG. 17 shows a data set configured for predicting insurance claim losses according to an embodiment of the present invention;

FIG. 18 shows a data set configured for predicting insurance subrogation recoveries according to an embodiment of the present invention;

FIG. 19 shows a data set configured for predicting fraud recoveries according to an embodiment of the present invention; and FIG. 20 shows a data set configured for predicting fraud recoveries at the entity level and detecting outlying entities according to an embodiment of the present invention.

DETAILED DESCRIPTION OF THE EMBODIMENTS OF THE INVENTION

Figure 1:
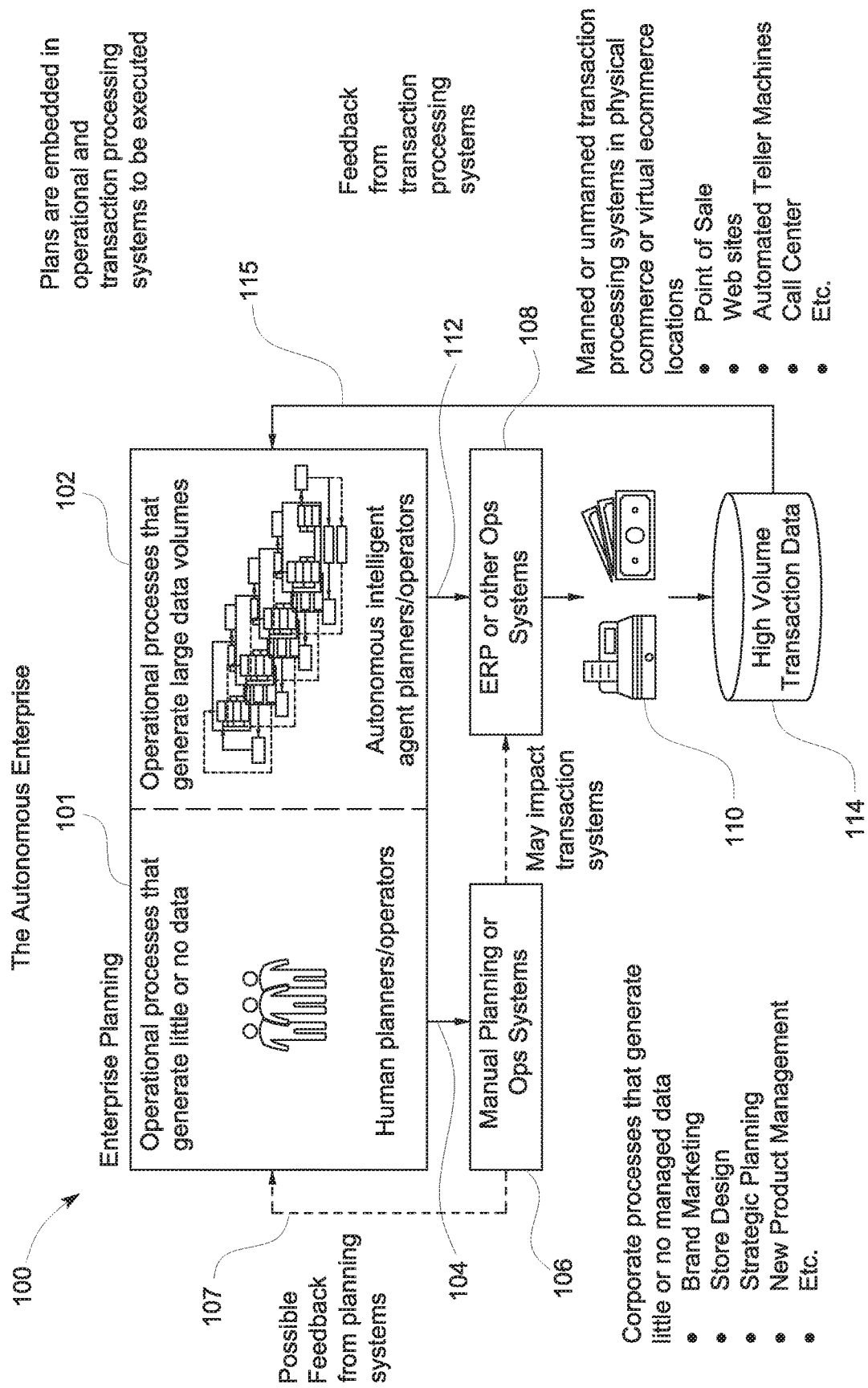
FIG. 1 shows in diagrammatic form an enterprise planning process and information flow for an autonomous enterprise planning system according to an embodiment of the present invention.

Reference is made to FIG. 1, which shows an autonomous enterprise planning system according to an embodiment of the present invention and indicated generally by reference 100. According to an exemplary implementation, the autonomous enterprise planning system 100 is configured to input data from two general types of processes. The first comprises operational processes that generate minimal data, or in some applications no data, as indicated generally by reference 101. The second comprises operational processes that are configured to generate large volumes of data as indicated generally by reference 102.

The operational processes 101 typically comprise corporate processes that generate little or no managed data, for instance, brand marketing, store design, strategic planning, new product management and the like, as indicated in FIG. 1. The operational processes 101 are typically under the control of human planners, who for example, manually input plans 104 into planning or other similar operational systems 106 which may also be integrated into ERP (Enterprise Resource Planning) systems or other operational computer systems indicated generally by reference 108 in FIG. 1. As also shown in the FIG. 1, the planning or operational systems 106 may be configured with a feedback loop 107 which is utilized to generate feedback data.

The operational or enterprise processes 102, on the other hand, generate large amounts or volumes of data. The data may be generated by both manned and unmanned transaction systems in physical commerce and/or virtual commerce facilities. The data comprises, for example, point-of-sale, web site, automated teller machine, call center data, and the like. As will be described in more detail below according to embodiments of the present invention, the operational or enterprise processes are configured to be executed or controlled utilizing one or more autonomous intelligent agent modules, indicated generally by reference 112 in FIG. 1. As will be described in more detail below, the autonomous intelligent agent modules 112 are configured to execute imbedded plans or control algorithms in the operational or enterprise processes 102. The generated data is collected by one or more transactions processing systems indicated generally by reference 114 and utilized to execute or perform autonomous planning operations or functions for the associated enterprise. According to another aspect, the transaction processing system 114 is configured with a feedback loop 115 to provide feedback data which can be utilized by the autonomous intelligent agent module(s) 112.

Figure 2:
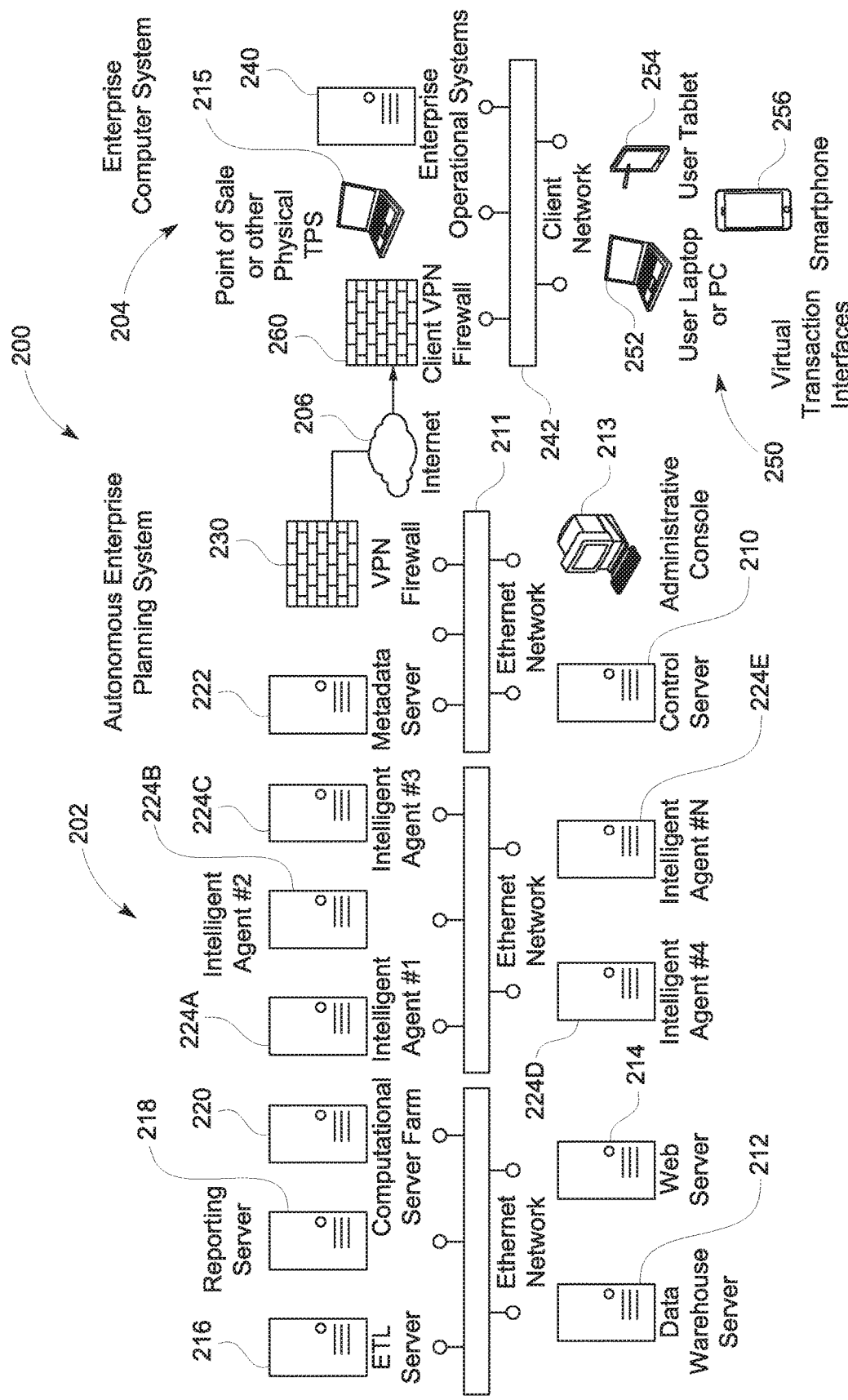
FIG. 2 shows a computer hardware system architecture for the autonomous enterprise planning system of FIG. 1, according to an embodiment of the present invention.

Reference is next made to FIG. 2, which shows a computer hardware architecture and components for an autonomous enterprise planning system according to an embodiment of the present invention and indicated generally by reference 200.

According one aspect and described in more detail below, the computer system and hardware 200 is configured to execute functions and processes under stored program and/or hardware control to operation of the operational processes 102 utilizing one or more autonomous intelligent agent modules for data driven planning functions of the enterprise. The autonomous intelligent agent module according to an embodiment is described in more detail below with reference to FIG. 4 and indicated generally by reference 400.

Figure 4:
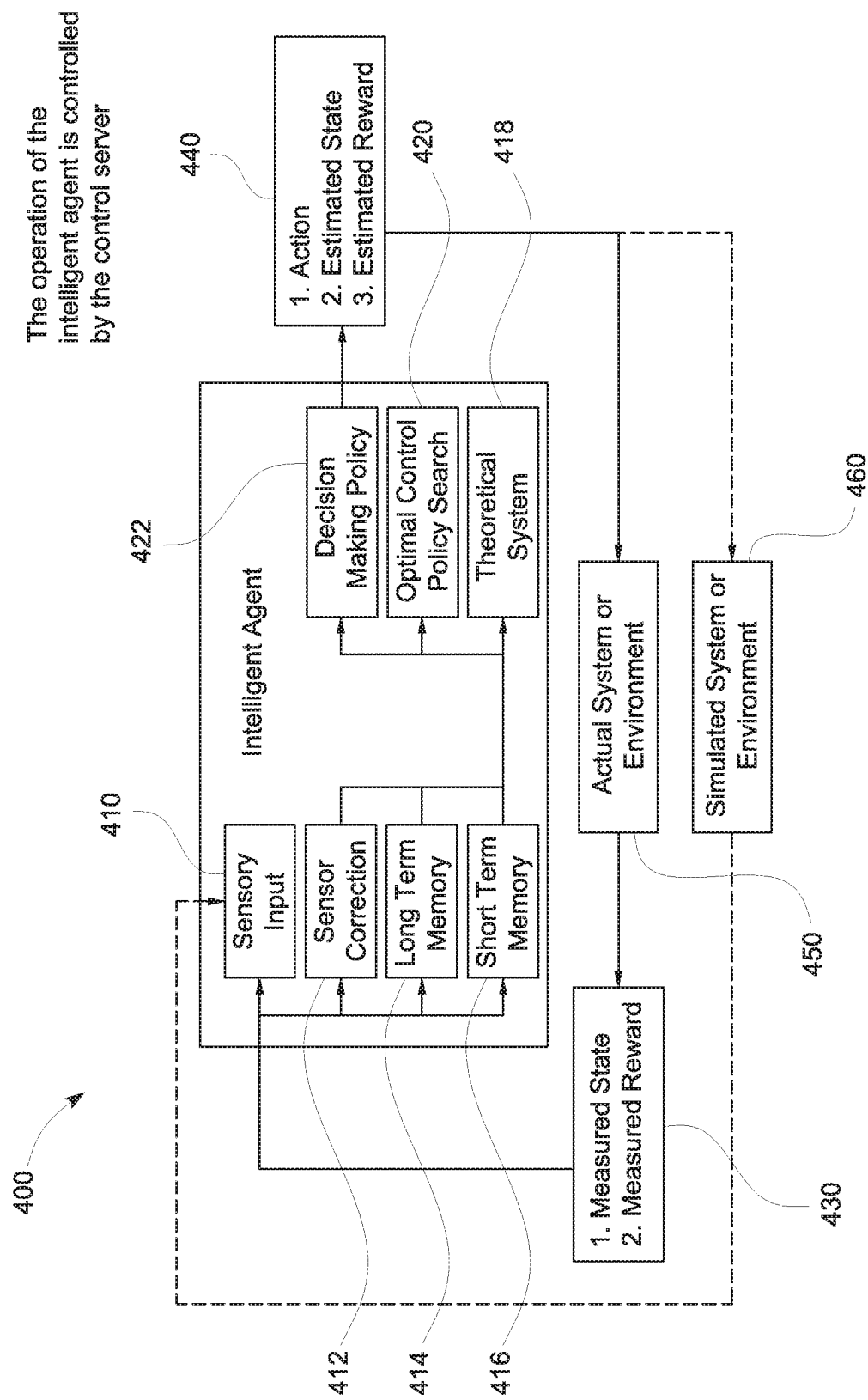
FIG. 4 shows in diagrammatic form an intelligent agent module for the autonomous enterprise planning system of FIG. 2 according to an embodiment of the present invention.

As shown in FIG. 4, the intelligent agent module 400 comprises the following components: a sensory input component 410, a sensor correction component 412, a long-term memory component 414, a short-term memory component 416, a theoretical system module component 418, an optimal control policy search component 420, and a decision-making policy component 422.

According to one aspect, the autonomous intelligent agent module(s) is configured to generate and deliver operational plan(s) to enterprise ERP or other operational systems 108 (FIG. 1). As shown in FIG. 1, the autonomous enterprise system 100 includes an enterprise transaction processing module or subsystem indicated by reference 110, which may comprise point of sale terminals, and other physical transaction processing systems, e-commerce or other online transaction processing systems. The resultant data for the transaction processing system 110a is stored and a closed loop feedback control system is formed with the autonomous intelligent agent modules 112 utilizing the feedback loop 115.

Reference is next made back to FIG. 2. The computer hardware infrastructure 200 comprises an enterprise planning computer system or facility indicated by reference 202 and a client side computer system indicated by reference 204. The enterprise planning computer system 202 comprises a control server 210, a data warehouse server 212, a web server 214, an ETL ("Extract, Transform, Load") server 216, a reporting server 218, a computational server farm 220, a metadata server 222, and one or more intelligent agent modules 224, indicated individually by references 224a, 224b, 224c, 224d and 224e in FIG. 2, and as described in more detail below. The computer servers are operatively coupled through a network, or other communication mechanism, for example, an Ethernet network, and indicated generally by reference 211. The client side computer system 204 comprises client operational or computer systems indicated generally by reference 240, which are operatively coupled through a client network 242 to a plurality of computers, or other transaction processing devices, indicated by reference 250, comprising, for example, a laptop computer 252 connected to e-commerce point of sale or other online transaction interface or in-store point of sale/or other physical transaction interface computer 215, user tablet(s) 254 (e.g. Apple iPads) that connect to ecommerce point of sale/or other online transaction interface, and/or smart phones and other mobile devices 256 that connect to ecommerce point of sale/or other online transaction interface.

As shown in FIG. 2, the enterprise planning computer system 202 is coupled to the client computer system 204 through the Internet 206. As also shown in FIG. 2, the retail planning computer system 202 interfaces to the Internet through a VPN (Virtual Private Network) Firewall 230, and similarly the client computer system 204 connects to the Internet 206 through a client VPN firewall indicated by reference 260. Each of the servers comprises computer hardware operating under stored programmed control, computer code and/or software to perform the processes and functions associated with core computer system functions, and the processes and operations according to embodiments of the present invention as described in more detail herein. The particular implementation details will be within the understanding of those skilled in the art of computers and computer programming.

The control server 210 includes an administrative console (for example, a desktop or laptop computer) 213 for accessing and configuring the control server 210. The control server 210 is configured to execute processes and functions associated with the intelligent agent modules 224, as described in more detail below with reference to FIG. 4 and indicated generally by reference 400.

Referring to FIG. 2, the data warehouse server 212 is configured to store raw and processed sensor data and forms, i.e. comprising transaction data 114 (FIG. 1), obtained from the client computer systems 204. According to another aspect, the data warehouse server 212 is configured to provide a long-term memory module or component for the intelligent agent module 400 (FIG. 4), as described in more detail below.

The Web server 214 is configured to deliver an enterprise plan, generated according to one aspect of the present invention, to the client computer system 204, and for example, to one or more of the user devices or appliances 250. The client enterprise plan is delivered by the Web server 214 through the firewall 230 and the Internet 206.

The ETL server 216 comprises a computer server or a plurality of servers, i.e. cluster of servers, and is configured to execute data processing jobs or operations associated with sensor data obtained from the client environment 204, for example, as described above for FIG. 1. The output generated by the ETL server 216 populates a long-term memory component 414 in the intelligent agent module 400 (FIG. 4) and a state measurement component 430 in the intelligent agent module 400 (FIG. 4).

The reporting server 218 is configured to execute a process or operations to display a new state and/or reward that occurs in the retail environment 204 (FIG. 2) based on the processing executed by the state measurement component 430 (FIG. 4). The reporting server 218 utilizes sensor input data 410 (FIG. 4) which is processed and received from the ETL server 216 (FIG. 2).

The computational server 220 is configured to execute processes or operations utilized to fit an enterprise environment theoretical model 418 (FIG. 4), processes to define a policy for enterprise actions or operations 422 (FIG. 4). The computational server 220 is further configured to apply the policy as indicated by 440 in FIG. 4. The computational server 220 is also configured to store results of executing policy information as short term memory 416 in FIG. 4.

The metadata server 222 is configured to execute processes or operations for storing configuration data that is used by the control server 210 to execute processes and functions associated with the operation of the intelligent agent module 400, as described in more detail below with reference to FIG. 4.

Figure 3:
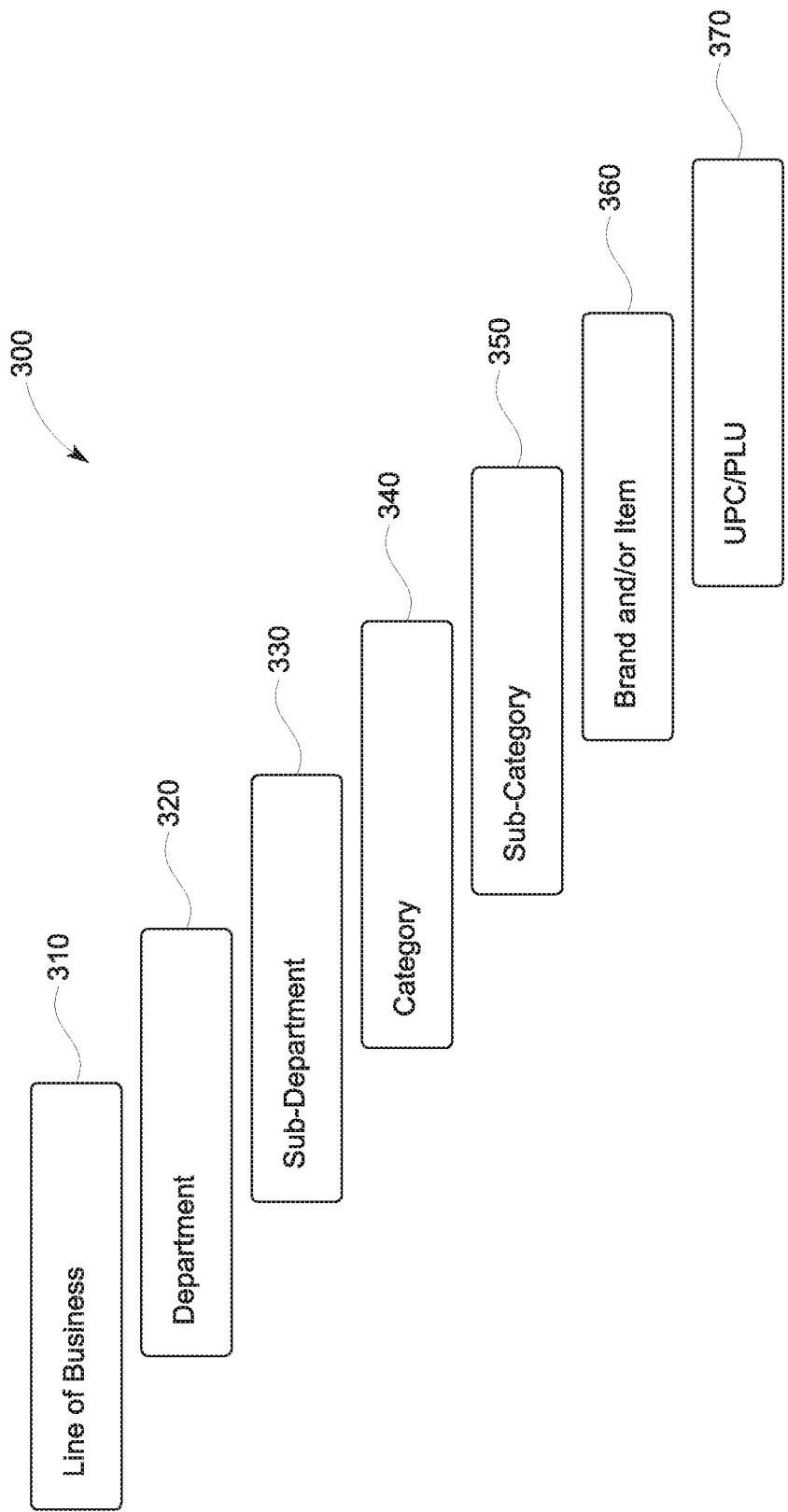
FIG. 3 shows a retail product hierarchy structure according to an exemplary embodiment of the present invention.

Reference is next made to FIG. 3, which shows a product hierarchy structure according to an embodiment of the present invention and indicated by reference 300. The product hierarchy 300 is defined based on a Line of Business 310 and comprises a top-down hierarchy with a Department level or layer 320, a Sub-Department level 330, a Category level 340, a Sub-Category level 350, and Brand and/or Item level 360 and a UPC/PLU level or layer 370. The UPC is a number code (Universal Product Code) that is used in barcodes on a product to permit scanning by a point of sale device. There are several international standard UPC formats. The PLU (Price Look Up) is a typically 4 or 5-digit number for non-barcoded products that a cashier can manually type into a point of sale device to look up its price.

Reference is next made to FIG. 4 which shows the intelligent agent module 400 according to an embodiment of the present invention. The intelligent agent module 400 is configured to operate in the environment of the enterprise or its ecommerce sites accessed through transaction interfaces 250 (FIG. 2) and according to one or more system states of the retailer environment 204. The system state is defined by time series data inputted and processed by the enterprise planning system 100. The time series data, in turn, comprises data typically collected by an enterprise in real-time as it processes transactions from its computer and operational systems.

According to an exemplary embodiment, the intelligence agent module 400 is configured to operate in two environments or modes: (1) an actual or operational control loop; and (2) a simulated control loop. The actual control loop mode is configured to operate in an actual real-world environment and inputs/processes periodic measurement data. The simulated control loop mode, on the other hand, is configured to operate in a simulated environment where the estimated state and estimated rewards or benefits are used as a proxy for actual measurements. According to another aspect, the system is further configured to utilize actual measurements to correct the estimated state every N simulations.

As shown in FIG. 4, the intelligent agent module 400 comprises an action output module 410. According to an exemplary embodiment, the action output module 410 is configured to generate an action plan, an estimated state for the enterprise environment and/or an estimated reward for the enterprise environment, indicated generally by reference 440. The intelligent agent module 400 is further configured to apply the action output to the actual enterprise system or environment as indicated by reference 450. According to another aspect, the intelligent agent module 400 is configured to input or measure state parameters and/or reward parameters of the enterprise system or environment in response to the application of the action plan, as indicated by reference 430 in FIG. 4, and described in more detail below. According to another aspect, the intelligent agent module 400 is configured with a simulation control loop 460. The simulation control loop 460 is configured to apply the action plan 440 to a simulated system or environment, and the response of the simulated system or environment is inputted by the sensory input component 410 and processed by the intelligent agent module 400.

The sensor input component 410 is configured to collect the raw data received from the retail or finance or industry environment, i.e. the enterprise or ecommerce/online transaction processing site or claims processing system or other transaction processing system. The sensor data is collected or inputted as depicted in FIG. 1. In an exemplary environment for the autonomous enterprise system 100, data comprising point-of-sale and/or e-commerce point-of-sale or other online transaction processing systems data is collected and stored in one or more computer systems 240 (FIG. 2) or at a data or computer centre associated with or configured for the enterprise 100. The collected data is packaged and transmitted in real-time and/or as batch data extracts 120 to the sensory input component 410 at the intelligent agent module 400 via the client VPN firewall 260 and the Internet 206.

According to another aspect, the intelligent agent module 400 is configured to input data for the autonomous enterprise system 100 on a periodic basis, for example, in near real-time, intra-daily, daily, intra-weekly or weekly. According to an exemplary implementation, the input data comprises transactions data/facts, and other dimensional entities associated with the transaction (i.e. location, product, customer, transaction type etc.). According to another exemplary implementation, the input data is associated with an insurance environment or application, and the data comprises underwriting transactions, claim submission transactions, premium payment transactions, claim payment transactions, policy holder lists, associated claim entity lists.

According to an exemplary configuration, the sensory input component 410 is configured to execute data warehousing operations in the collection, correction and/or management of data inputs. The sensor input data is stored in the long-term memory component 412, i.e. for a data warehouse, and in the short-term memory component 414, i.e. for data mart(s), or recent control actions and/or control action candidates, as described in more detail below.

Referring to FIG. 4, the sensor correction component 412 is configured to correct or adjust the sensor inputs for "measurement noise". In simulated control loop operation, the sensor correction component 412 is configured to correct the simulated state of the environment with an actual state measurement.

The theoretical system model component 418 is configured to execute an enterprise planning process that governs the behavior and operation of the enterprise planning system dynamically and in equilibrium, as will be described in more detail below.

The long-term memory component 414 is configured to provide functionality and store data for use by the enterprise system planning process having a longer-term frequency response and/or historical control actions.

The short-term memory component 416 is configured to provide functionality and store data for the enterprise system planning process having a shorter-term frequency response and/or recent control actions.

The optimal control policy search component 420 is configured to utilize the current and historical states of the enterprise environment and the retail system planning process to generate an optimal control policy or plan that sufficiently maximizes long-term reward or planning goals for the enterprise and maintains stable control in the intelligent agent module 400.

The decision making policy component 422 is configured to utilize the output of the optimal control policy component 420 to search and select a stable next action which can be executed given the current state of the long-term memory component 414 and/or the short-term memory component 416.

Figure 5:
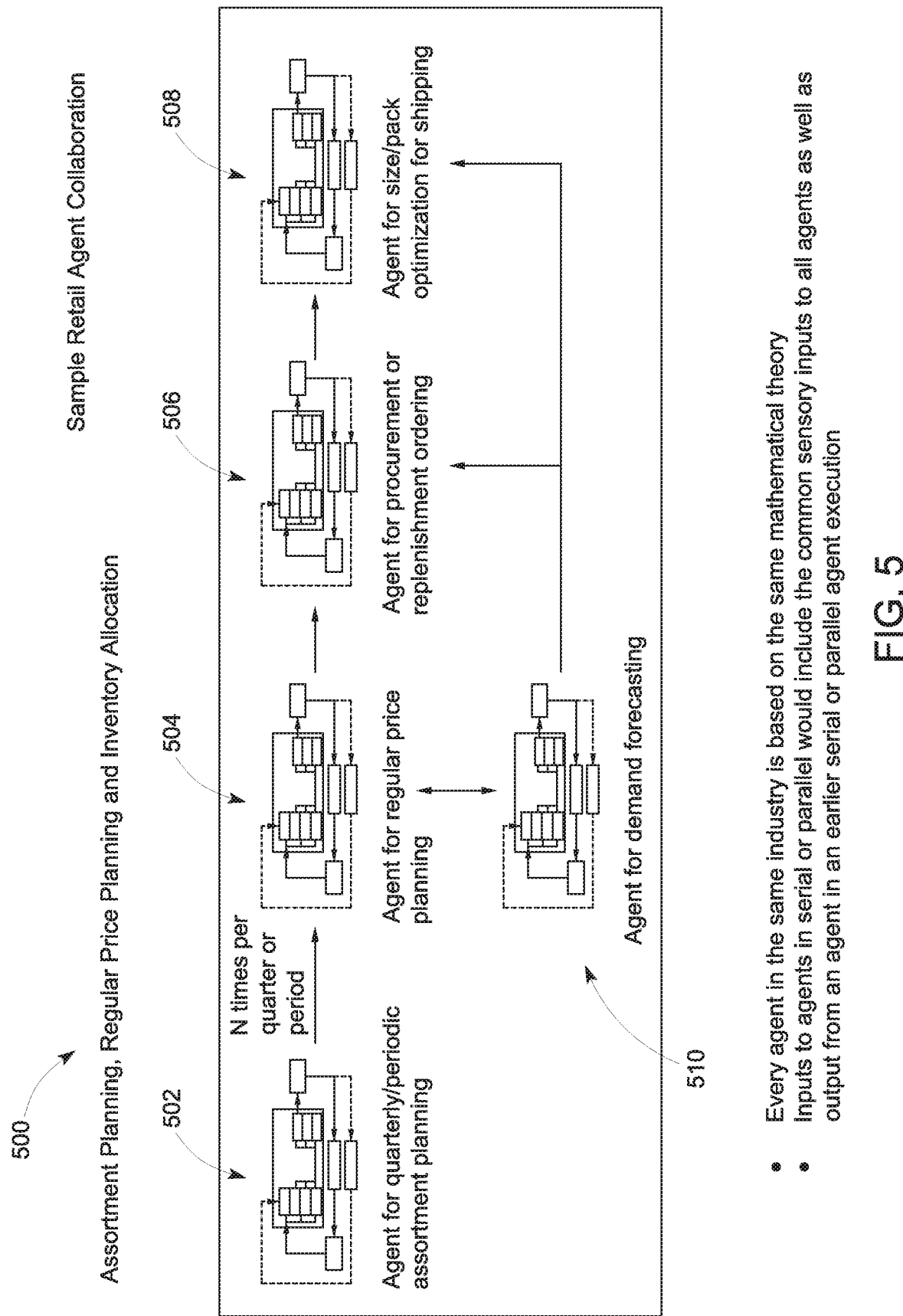
FIG. 5 shows in diagrammatic form an arrangement of multiple intelligent modules configured for executing high level planning operations for a retail assortment planning, regular pricing and inventory allocation application or function for the autonomous enterprise planning system of FIG. 1, according to an embodiment of the present invention.

Reference is next made to FIG. 5, which shows an arrangement of multiple intelligent agent modules 500 configured to interoperate to perform higher level planning functions. The intelligent agent modules 500 are configured to collaborate to achieve retail assortment planning, regular price planning and inventory allocation functions as described in more detail below.

As shown the intelligent agent modules 500 comprise (1) an intelligent agent module 502 configured for generating quarterly/periodic assortment planning; (2) an intelligent agent module 504 configured for generating regular price planning; (3) an intelligent agent module 506 configured for determining procurement or replenishment ordering; (4) an intelligent agent module 508 configured for determining size/package shipping optimization; and (5) an intelligent agent module 510 configured for determining demand forecasting. Each of the intelligent agent modules comprises a general architecture or configuration as described above with reference to FIG. 4.

Figure 10:
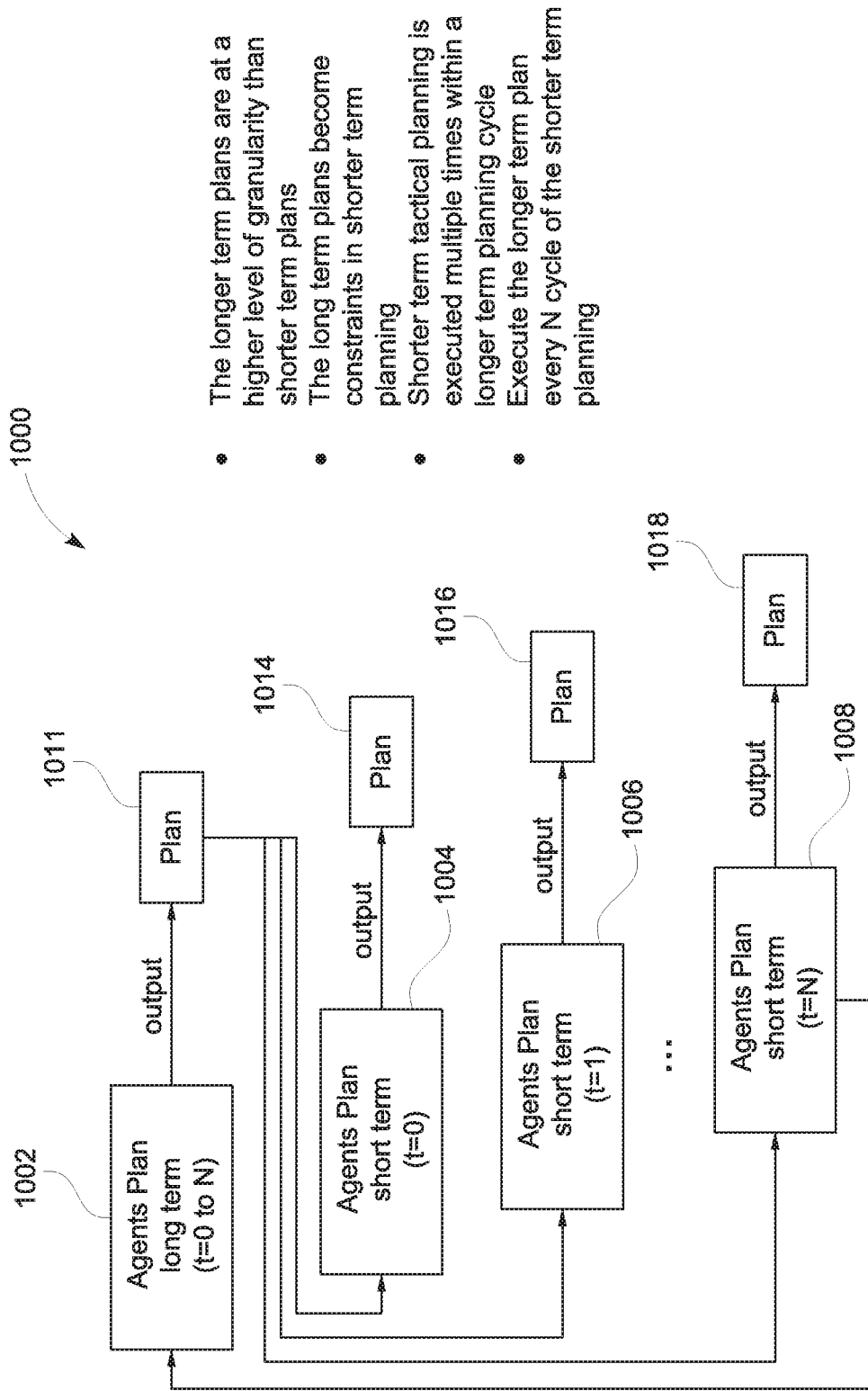
FIG. 10 shows in diagrammatic form a relationship between higher level long term planning tasks and lower level more frequent planning tasks defined according to an embodiment of the present invention.

The intelligent agent module 502 is configured to use transaction data input (FIG. 1), which is collected at the input sensors 410 (FIG. 4) to autonomously develop high level assortment planning on a quarterly or other periodic basis, for example, as depicted in FIG. 10, which is described in more detail below. The high level refers to planning at a higher level of aggregation in the product hierarchy described in FIG. 3. The assortment plan at a high level comprises the financial targets that the retailer must satisfy. The quarterly or other periodic planning output from the assortment planning intelligent agent module 502 is utilized as input for the intelligent agent module 504 configured for regular price planning. In addition to the output from the intelligent agent module 502, input sensor 410 for the intelligent agent module 504 is also configured to collect transaction data (FIG. 1). The regular pricing intelligent agent module 504 is configured to generate regular price plans at the brand and/or item level 360 (FIG. 3) in the product hierarchy 300 (FIG. 3).

As shown in FIG. 5, the regular pricing intelligent agent module 504 is also configured to utilize output generated by the forecasting intelligent agent module 510 to determine the item forecasts for any given price evaluated by the regular price agent. The input sensors for the forecasting intelligent agent module 510 are configured to collect the price output from the regular pricing intelligent agent module 502 and transaction data (FIG. 1), and return a forecast in response to each request from the regular pricing intelligent agent module 504. The regular pricing intelligent agent module 504 then determines the regular prices for all brands and/or items 360 that will achieve or meet the quarterly or other periodic financial plans determined by the assortment planning intelligent agent module 502. The regular price plans and forecast quantity output generated by the regular pricing intelligent agent 504 is used as input by the procurement or replenishment order intelligent agent module 506.

The procurement intelligent agent module 506 is configured to input or collect both output from the regular pricing intelligent agent module 504 and also transaction data from operating environment of the autonomous enterprise (FIG. 1). According to an exemplary implementation, the procurement intelligent agent module 506 is configured to determine the quantity of products that must be ordered from vendors from whom the retailer purchases product, and generates corresponding "open to buy orders" for the season or next period and/or automatic replenishment levels for products that are frequently purchased by the retailer associated with the enterprise.

As shown in FIG. 5, the output, i.e. the procurement output, generated by the procurement intelligent agent 506 is utilized as input to the size/pack optimization intelligent agent module 508. The input sensors for the intelligent agent module 508 are configured to collect the procurement output from the intelligent agent 506 and also transaction input data for the enterprise. The size/pack optimization intelligent agent module 508 is configured to determine the optimal size/pack distribution ordered from the vendors and to be packaged for delivery to retail stores.

According to an embodiment, the intelligent agent modules are configured to execute a mathematical algorithm to determine or generate optimal actions associated with the function or operation of the specific intelligent agent module. It will be appreciated that this serves to ensure that the intelligent agent modules are working in unison, i.e. towards a common goal, for example as shown in FIG. 11 and described in more detail below. According to an exemplary, the mathematical algorithm comprises Equation (1) as follows:

$$\hat{s}(t) = \sum_{i=1}^{N}\left[\sum_{mo=1}^{n_m}\left\{\sum_{ps=1}^{n_{ps}}\left(\sum_{p=1}^{n} f_p(a(t_{ps}), b(x, t_{ps})) + \left[\sum_{j=1}^{m}\left\{(x(t)_j - x'(t_{ps})_j)y_j(t_{ps})p_j(t_{ps})\sum_{k=1}^{m}\beta_{c(j)}(A_{jk}(t_{ps}) - B_{jk}(t_{ps}))R_{d(k)}\right\} + Vj\right]\right)_{ps}\right\}_{mo}\right]$$

where
$\hat{s}$=total sales, gross margin or transactions for the period in question (i.e. time t)

All feature values and theory components are for time $t_{ps}$ the relevant power spectrum peaks.

N=number of weeks for the historical data used for the calibration
$n_{ps}$=number of power spectrum peaks used
$n_m$=number of sub-segments (i.e. geographic region, price zone, store cluster, store type, customer segment)
n=number of terms in the predictive model (i.e. number of coefficients)
m=the number of elements of the product hierarchy level used in the equation $x_j$=the number of products being promoted in the week in question where the product can be represented by any level in the product hierarchy whose elements are identified by index j. This is an integer.
$x_j'$=the number of products promoted in a prior period of interest for hierarchy level value j. This is an integer.
$f_p(a,b(x_p))$=linear or non-linear model with features calculated at prior periods of interest, with
a=non-actionable features (these variables don't depend on the solution vector x)
b(x)=actionable features (depend on the solution vector x)
In linear form, $$f_p(a,b(x)) = C_0 + C_1 a_1 + C_2 a_2 + \ldots + C_r a_r + C_{r+1} b_1 + C_{r+2} b_2 + \ldots + C_n b_{n-1-r}; \text{ where } r=(1,n)$$

$C_p$=coefficients (that will be calibrated)
r=number of non-actionable features in the model
n−r=number of actionable features in the model
P=Average sales, margin or transactions per week
P can be further decomposed to q (quantity) times p (average price) for sales, q times gm (Average margin)
$y_j$ is a fraction of the total average sales, margin or transactions per week representing the fact the increasing the number of products promoted within a hierarchy sub-tree does not scale linearly and it cannot scale beyond the maximum number of products available. Based on actual data unique to each product hierarchy sub-tree, it is possible to fit a polynomial curve or other diminishing curve to the actual data.
$A_{jk}$=affinity matrix showing affinity between itemset j with itemset k. Item could be any level in the product hierarchy. For sales or margin optimization, affinity elements are confidence, for transaction optimization the elements are support.
$B_{jk}$=cannibalization matrix showing cannibalization between itemset j with itemset k. Item could be any level in the product hierarchy. For sales or margin optimization, cannibalization elements are scaled to affinity confidence, for transaction optimization the elements are scaled to affinity support.
$R_{d(k)}$=resultant binary of item k . . . the coefficient is a function of k, the number of coefficients is less than or equal to k $$R_k = \begin{cases} 0 & \text{if } (x_k - x_k') = 0 \\ 0 < c < 1 & \text{otherwise} \end{cases} \text{ the constant } c \text{ to be Calibrated}$$

$\beta_{c(j)}$=unknown model coefficient to be calibrated . . . the coefficient is a function of j, the number of coefficients is less than or equal to k
$V_j$=any marketing funding provided to the retailer in exchange for including the product j in the promotion for a specific period or periods.

Figure 16:
FIG. 16 shows a data set configured for determining forecasting demand adjusted quantity according to an embodiment of the present invention.

The promo product selection agent utilizes Equation 1, after its calibration coefficients have been determined, without the metric of interest P decomposed to select the products to be promoted (for full details see the promo product patent). The forecasting agent outputs uses the range of possible price inputs p for the products selected for promotion or markdown in the case of promo/markdown planning or regular price in the case of assortment planning and all other exogenous input variables or feature components of the mathematical theory as shown in FIG. 16 and indicated by reference 1600. The output of the forecasting agent comprises a table of prices p and forecasted quantities q for each product, store and time-period in question (i.e. promotional products, markdown products, regular priced products). Product forecasts are executed at the "Brand and/or item" or "UPC/PLU" level of the product hierarchy of FIG. 3. The forecasting agent provides a forecast for each time-period, product, price and store combination requested. The forecasted quantities and prices are aggregated to be at the same level of the product hierarchy that Equation (1) is used at. This equation is typically set up for the department, sub-department or category level of the product hierarchy of FIG. 3. The price optimization agent uses Equation (1), after its calibration coefficients have been determined, and the lookup table of aggregated promotional or markdown price, quantities, store, product, time-period to determine the optimal price that will maximize the metric of interest P. For assortment planning Equation (1) is used with a lookup table of aggregated regular product, price, quantities, store, time-period to determine the optimal assortment (products and quantities) that will achieve the corporations overall financial plan or maximize the metric of interest ŝ. The price optimization agent requires all possible prices to be forecasted. The forecasted quantity associated with the optimal promotional, markdown or regular price as optimized by the pricing agents is used as input into the procurement and/or replenishment ordering and inventory allocation agents which determines the number of each product to be purchased and/or shipped to each store for each time-period in question subject to a company's set "safety-stock" levels as is industry practice. The size/pack optimization agent uses the number of product to be purchased and/or shipped to each store for each time-period to minimize the overall enterprise logistics costs associated with ordering and/or packaging product from the manufacturer as is standard industry practice.

The control server 210 (FIG. 2) is configured to autonomously manage the operational configuration and execution of the processes associated with the intelligent agent modules 502, 504, 506, 508 and 510, as described above. According to another aspect, the outputs generated by the intelligent agent modules is also delivered to the ERP 108 (FIG. 1) and/or to the other planning systems 240 in the enterprise computer system 204 (FIG. 2) to permit execution by transactions systems 110 (FIG. 1) over the Internet 206 and through the retailer firewall 260.

Figure 6:
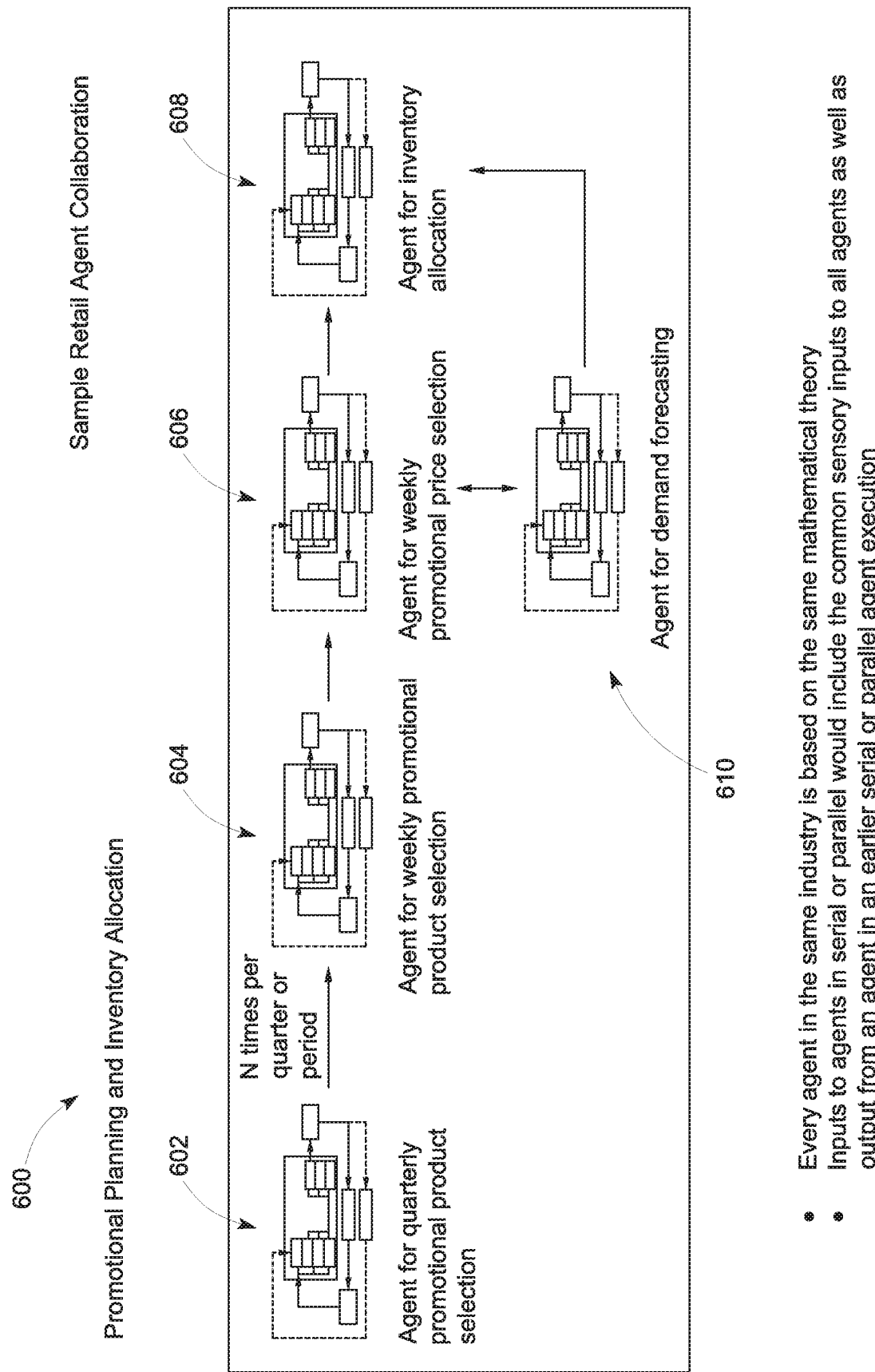
FIG. 6 shows in diagrammatic form an arrangement of multiple intelligent modules configured for executing high level planning operations for a retail promotion planning and inventory allocation application or function for the autonomous enterprise planning system of FIG. 1, according to an embodiment of the present invention.

Reference is made next to FIG. 6, which shows an arrangement of multiple intelligent agent modules configured to operate in the execution of functions in the context of promotion planning and inventory allocation for an enterprise, as indicated generally by reference 600. As shown, the multiple intelligent agent modules comprise: (1) an intelligent agent module for quarterly promotional product selection 602; (2) an intelligent agent module for weekly promotion product selection 604; (3) an intelligent agent module for weekly promotional price selection 606; (4) an intelligent agent module for inventory allocation 608; and (5) an intelligent agent module for demand forecasting 610.

The quarterly promotional product selection intelligent agent module 602 is configured to collect transaction data (FIG. 1) at the input sensors 410 (FIG. 4) and autonomously develop a quarterly or periodic high-level promotion plan. FIG. 10 depicts the relationship between high level and detailed planning and its frequency according to an exemplary embodiment, as described in more detail below. It will be appreciated that "high-level" in the context of this application refers to planning at a higher level of aggregation in the product hierarchy described in FIG. 3. The high-level promotion plan generated determines the number of sub-categories 350 or brand and/or items 360 that are to be promoted each week from each department 320, sub-department 330 or category 340, as shown in FIG. 3.

The output, i.e. generated plan, from the intelligent agent module 602 is provided, i.e. delivered to the weekly promotion product intelligent agent module 604. The input sensor of the intelligent agent module 604 collects transaction data and the output from the quarterly promotional product selection intelligent agent module 602 and utilizes the data as weekly constraints in calculations according to the mathematical algorithm. The weekly promotion product selection intelligent agent module 604 is configured to autonomously develop weekly product promotion plans which comprise lists of specific sub-categories 350 or brand and/or items 360 (FIG. 6).

The input sensors of the weekly promotional price selection intelligent agent module 606 input the output generated by the weekly promotion product selection intelligent agent module 604 and transaction data (FIG. 1). The intelligent agent module 606 is configured to autonomously generate a promotional price plan at the brand and/or item level 360 of the product hierarchy (FIG. 3). The promotional price intelligent agent module 606 also utilizes the output from the demand forecasting intelligent agent module 610 (for example, as described above for the intelligent agent module 510) to determine the item forecasts for any given price evaluated by the promo price agent. As shown, the input sensors 410 for the demand forecasting intelligent agent 610 collect the price output from the intelligent agent 606 and also transaction data (FIG. 1). The demand forecasting intelligent agent 610 is configured to generate a forecast for each request from the promotional price intelligent agent 606. The promotional price selection intelligent agent 606 is configured to generate promotional prices for all brands and/or items 360 (FIG. 3) that will maximize retailer financial performance.

As shown in FIG. 6, the input sensors for the inventory allocation intelligent agent module 608 input the promotional price plan generated by the intelligent agent module 606 and demand forecast plan generated by the demand forecasting intelligent agent module 610. Utilizing transaction data and the inputted plans, the inventory allocation intelligent agent 608 is configured to determine or calculate the quantity of products that must be allocated to each store or distribution centre to achieve or exceed the forecasted quantity determined by the weekly promotional price selection intelligent agent module 606.

As described above, the intelligent agent modules 600 are configured to execute a mathematical algorithm or model according to Equation (1) to determine or generate optimal actions associated with the function or operation of the specific intelligent agent module. It will be appreciated that this serves to ensure that the intelligent agent modules are working in unison, i.e. towards a common goal, for example as shown in FIG. 11.

The control server 210 is configured to autonomously manage the operational configuration and execution of the processes associated with the intelligent agent modules 602, 604, 606, 608 and 610, as described above. According to another aspect, the outputs generated by the intelligent agent modules is also delivered to the ERP 108 (FIG. 1) and/or to the other planning systems 240 in the enterprise computer system 204 (FIG. 2) to permit execution by transactions systems 110 (FIG. 1) over the Internet 206 and through the retailer firewall 260.

Figure 7:
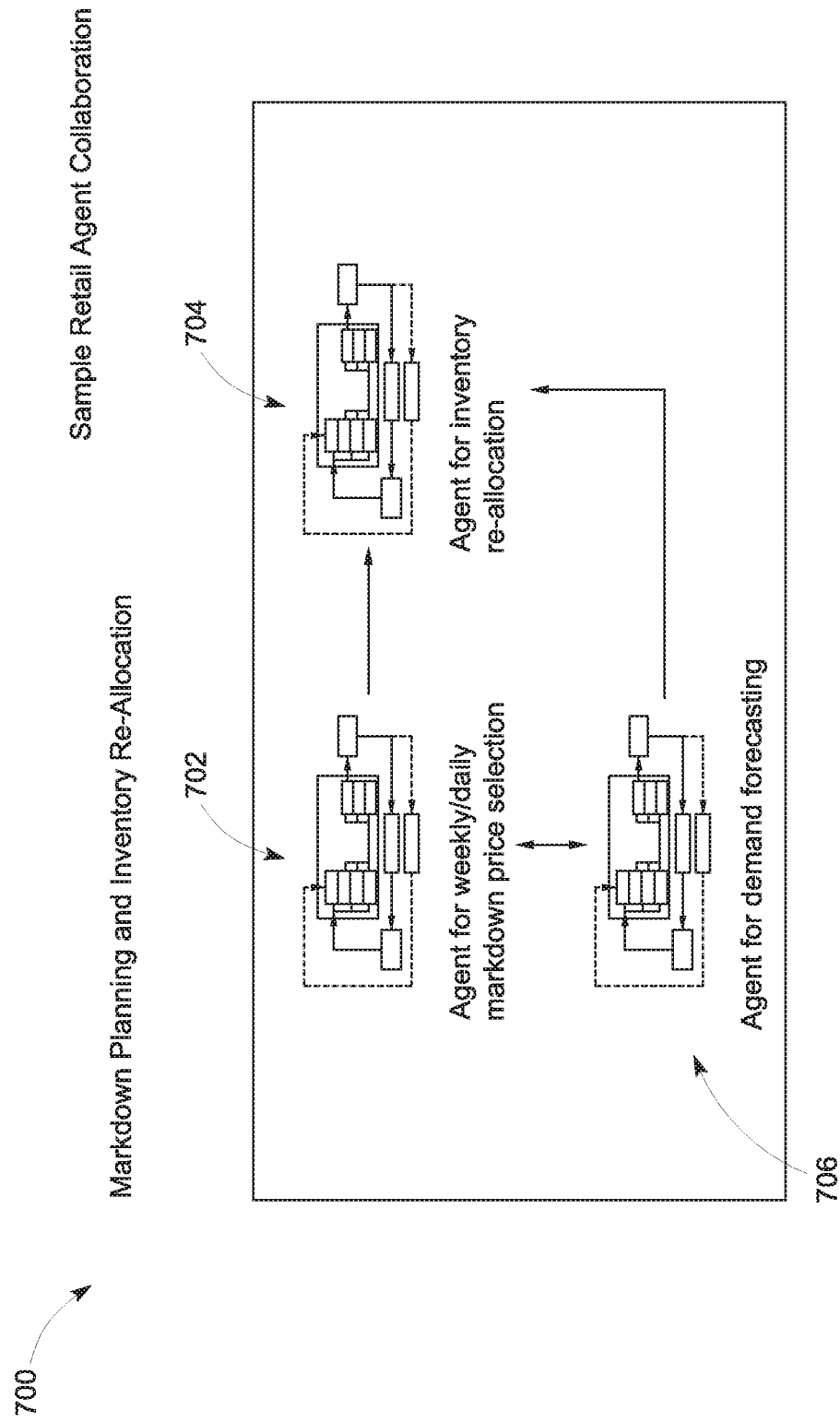
FIG. 7 shows in diagrammatic form an arrangement of multiple intelligent modules configured for executing high level planning operations for a retail markdown and inventory re-allocation planning function or operation for the autonomous enterprise planning system of FIG. 1, according to an embodiment of the present invention.

Reference is made next to FIG. 7, which shows an arrangement of multiple intelligent agent modules configured to operate in the execution of higher level planning functions in the context of markdown planning and inventory re-allocation for an enterprise, as indicated generally by reference 700. As shown, the multiple intelligent agent modules comprise: (1) an intelligent agent module for weekly/daily markdown price selection 702; (2) an intelligent agent module for inventory re-allocation 704; and (3) an intelligent agent module for demand forecasting 706.

The weekly/daily markdown price selection agent 702 is configured to collect transaction data (FIG. 1) at the input sensors 410 and autonomously generate weekly, daily or other periodic markdown price plans at the brand and/or item level 360 of the product hierarchy 300 (FIG. 3). As shown, the markdown price selection intelligent agent module 702 is operatively coupled to the demand forecasting intelligent agent module 706 and configured to utilize outputs, i.e. demand forecasts, and determine the item forecasts for any given price evaluated by the markdown price agent. The demand forecasting intelligent agent module 706 uses its sensors 410 to collect the outputs, i.e. price plans, generated by the intelligent agent module 702 and transaction data (FIG. 1), and is configured to generate and return a forecast for each request from the markdown price selection intelligent agent 702. According to one aspect, the markdown price selection intelligent agent 702 is configured to determine the markdown prices for the brands and/or items 360 (FIG. 3) that will achieve or meet the demand forecast plans from the intelligent agent 706.

As also shown in FIG. 7, the inventory re-allocation intelligent agent module 704 is also operatively coupled to the weekly/daily markdown selection intelligent module 702. The sensors of the inventory re-allocation intelligent agent 704 are configured to collect output generated by intelligent agent module 702 and transaction data (FIG. 1) from the enterprise. The inventory re-allocation intelligent agent module 704 is configured to determine the quantity of products that must be re-allocated to each store, or distribution centre, in order to achieve or clear the forecasted quantity as determined by weekly/daily markdown price selection intelligent agent 702 at the maximum profit possible.

As described above, the intelligent agent modules 700 are configured to execute a mathematical algorithm to determine or generate optimal actions associated with the function or operation of the specific intelligent agent module. It will be appreciated that this serves to ensure that the intelligent agent modules are working in unison, i.e. towards a common goal, for example as shown in FIG. 11.

The control server 210 is configured to autonomously manage the operational configuration and execution of the processes associated with the intelligent agent modules 702, 704 and 706, as described above. According to another aspect, the outputs generated by the intelligent agent modules is also delivered to the ERP 108 (FIG. 1) and/or to the other planning systems 240 in the enterprise computer system 204 (FIG. 2) to permit execution by transactions systems 110 (FIG. 1) over the Internet 206 and through the retailer firewall 260.

Figure 8:
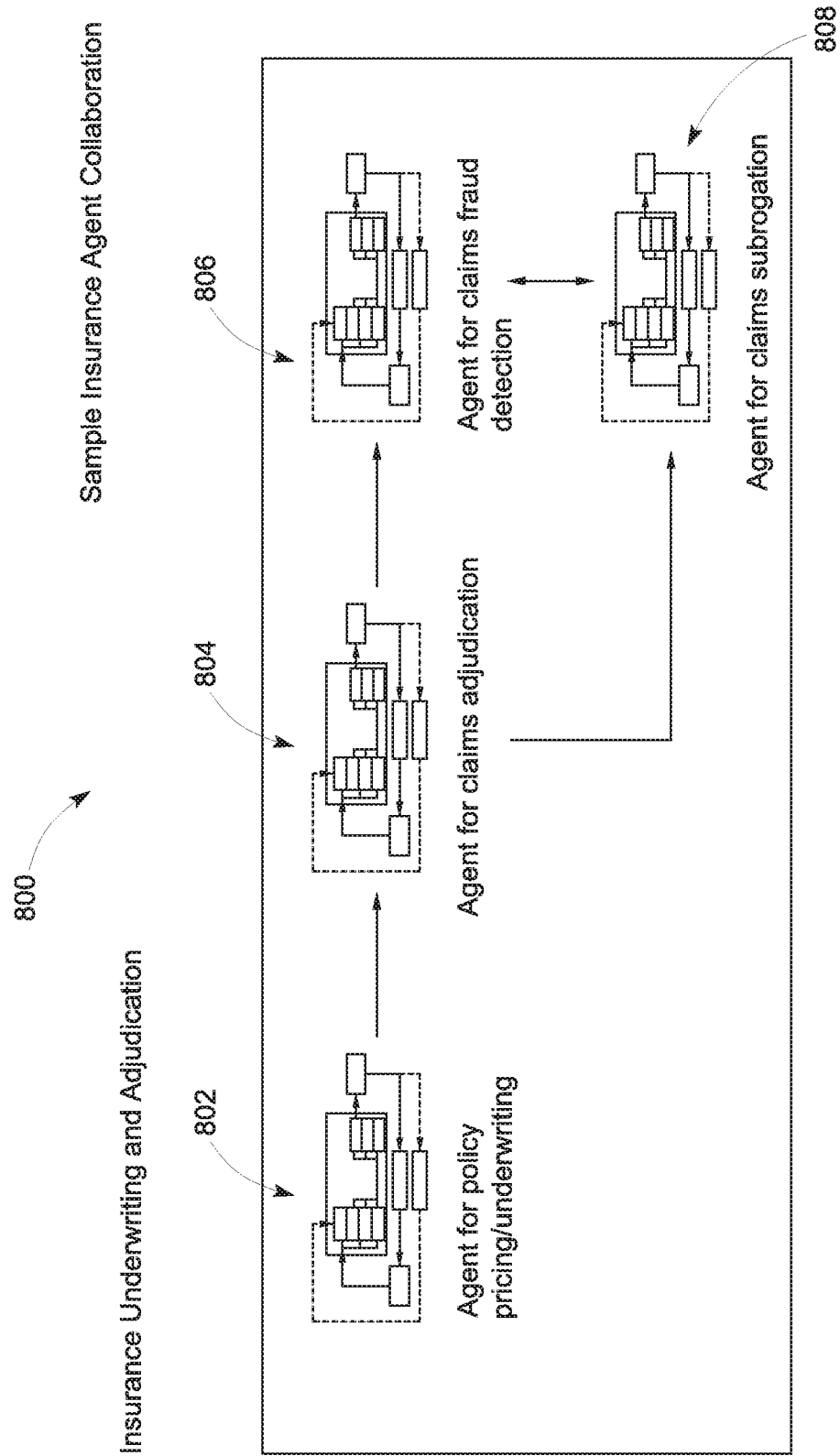
FIG. 8 shows in diagrammatic form an arrangement of multiple intelligent modules configured for executing high level planning operations for an insurance underwriting and adjudication planning application or function configured for the autonomous enterprise planning system of FIG. 1, according to an embodiment of the present invention.

Reference is made next to FIG. 8, which shows an arrangement of multiple intelligent agent modules configured to operate in the execution of higher level planning functions in the context of an insurance underwriting and adjudication application, according to another embodiment and indicated generally by reference 800. As shown, the multiple intelligent agent modules comprise: (1) an intelligent agent module configured for insurance policy pricing/underwriting 802; (2) an intelligent agent module configured for insurance claims adjudication 804; (3) an intelligent agent module configured for fraudulent claims detection 806; and (4) an intelligent agent module configured for claims subrogation 808.

As shown in FIG. 8, the policy pricing and underwriting intelligent agent module 802 is configured to collect at is input sensors transaction data from the enterprise (i.e. insurance enterprise or company) at its input sensors 410. Based on the collected data, the intelligent agent module 802 is configured to autonomously make underwriting decisions, comprising assessing the risk of each policy, and generating a policy price for each request, i.e. a risk rating and pricing output. According to another aspect, the intelligent agent module 802 is further configured to optimize the overall loss ratio of the insurance portfolio.

As shown the claims adjudication intelligent agent module 804 is operatively coupled to the policy pricing/underwriting intelligent agent 802. The claims adjudication intelligent agent module 804 is configured to use its input sensors 410 to collect, i.e. the input risk rating and pricing output, from the intelligent agent module 802 and also input transaction data from the insurance enterprise (FIG. 1). Based on the collected inputs, the claims adjudication intelligent module 804 is configured to autonomously adjudicate claims and determine an appropriate queue for the claim, i.e. payment, fraud or subrogation.

The output from 802 and 801 is used as input to the fraud detection agent 803. The fraud detection agent 803 uses its input sensors 410 to collect risk rating, pricing output from 801 and adjudication output from 802 as well as transaction data 107 to autonomously investigate and decide which claims to pay/not pay and which entities (policy holders/patients, medical providers/payees, social networks, internal employees) are committing fraud. The output from 802 and 801 is used as input to the subrogation agent 804. The subrogation agent 804 uses its input sensors 410 to collect risk rating, pricing output from 801 and adjudication output from 802 as well as transaction data 107 to autonomously decide which claims should be subrogated and claims filed against other insurers are parties responsible for the claim.

The intelligent agent modules 800 are configured to execute a mathematical algorithm or model to determine or generate optimal actions associated with the function or operation of the specific intelligent agent module. It will be appreciated that this serves to ensure that the intelligent agent modules are working in unison, i.e. towards a common goal. In the context of an insurance application, the mathematical algorithm or model is defined according to an Equation (4) as follows:

$$\hat{s}(t) = \sum_{i=1}^{N} \left[ \sum_{mo=1}^{n_m} \left\{ \sum_{ps=1}^{n_{ps}} \left( \sum_{p=1}^{n} f_p(a(t_{ps}), b(Fr, t_{ps})) + \left[ \sum_{j=1}^{m} \left\{ \sum_{k=1}^{m} \left( \alpha_{c(j)}(Pr(t)_j - Pr'(t_{ps})_j) * I_{jk}^{Pr} * R_{Pr(k)} + \beta_{c(j)}(Cl(t)_j - Cl'(t_{ps})_j) + \gamma_{c(j)} * I_{jk}^{O/H} * R_{Cl(k)} * P \right) * (Fr(t)_j - Fr'(t_{ps})_j) \right\} \right] \right)_{ps} \right\}_{mo} \right]$$

where
$\hat{s}$ = total gross profit for the period in question (i.e. time t)

All feature values and theory components are for time $t_{ps}$ the relevant power spectrum peaks which are auto-correlated to the time t.

N=number of weeks for the historical data used for the calibration $n_{ps}$=number of power spectrum peaks used $n_m$=number of sub-segments (i.e. geographic region, risk segments, product type)

n=number of terms in the predictive model (i.e. number of coefficients)

m=the number of elements of the product hierarchy level used in the equation $Fr_j$=the number of fraudulent claims being avoided in the time period in question where the fraudulent claims can be represented by entity level associated with a claim (claim itself, claimant, third party, claim investigator etc.) whose elements are identified by index j. This is an integer.

$Fr_j'$=the number of fraudulent claims avoided in a prior period of interest for entity level value j. This is an integer.

$Pr_j$=the insurance premium revenue to be collected in the period of interest for entity level value j.

$Pr_j'$=the insurance premium revenue collected in a prior period of interest for entity level value j.

$Cl_j$=the forecasted claim losses net of subrogation recoveries to be paid in the period of interest for entity level value j.

$Cl_j'$=the actual claim losses paid net of subrogation recoveries in a prior period of interest for entity level value j.

$f_p(a,b(x_p))$=linear or non-linear model to forecast claim loss risk and set premiums with features calculated at prior periods of interest, with a=Non-actionable features (these variables aren't dependent on)

b(Fr)=actionable features (depend on the solution vector Fr)

In linear form, $$f_p(a,b(Fr))=C_0+C_1a_1+C_2a_2+\ldots+C_ra_r+C_{r+1}b_1+C_{r+2}b_2+\ldots+C_nb_{n-1-r}; \text{ where } r=(1,n) \quad \text{Equation 5.0}$$

$C_p$=coefficients (that will be calibrated)

r=number of non-actionable features in the model n−r=number of actionable features in the model $I_{jk}^{Pr}$=interaction matrix between entity level j with entity level k which captures the interaction between increased fraud detection and potential revenue loss or gain by segment.

$I_{jk}^{O/H}$=interaction matrix between entity level j with entity level k which captures the interaction between increased fraud detection and impacts on overhead loss or gain by segment.

P=O/H costs including (call-centre calls from entity level j+cost of investigations/adjudication for entity level j+cost of technology to investigate entity level j)

$R_{Pr(k)}, R_{C(k)}$=resultant binary of item k . . . the coefficient is a function of k, the number of coefficients is less than or equal to k $$P_{Pr(k)}, R_{Cl(k)} = \begin{cases} 0 & \text{if } [(x)]_k - x'_k) = 0 \\ 0 < Cpr \text{ or } Ccl < 1 & \text{otherwise} \end{cases}$$

the constant $Ccl$ and $Cpr$ to be Calibrated $\alpha_{c(j)}, \beta_{c(j)},$ and $\gamma_{c(j)}$=unknown model coefficients to be calibrated . . . the coefficient is a function of j, the number of coefficients is less than or equal to k The policy pricing/underwriting agent use a data set 1700 for instance as shown in FIG. 17 to predict claim losses using industry standard methods of predictive modeling and generate Equation (5), as described in more detail below. The claim loss predictions are sorted in order of magnitude and bucketed into a number of segments (which is an input into the agent), where the premium for each segment is determined from the distribution of predicted losses at the policy level within that segment. Typical modes used for determining the premium is the average, minimum or maximum. The pricing/underwriting agent outputs Equation (5) and policy segment prices which to the claims adjudication agent. The claims adjudication agent is configured to utilize Equation (4) and Equation (5) to determine the optimal level of claims fraud detection by policy segment to maximize overall insurance company profit and the level of subrogation recoveries required to achieve the target claim loss by segment. The subrogation agent utilizes a data set 1800 as shown in FIG. 18 to predict subrogation recoveries using industry standard methods for predictive modeling and generates an equation having the same form as Equation (5). The incoming claims are scored with the subrogation agent model and the claims with a subrogation score above the desired threshold (input to the agent based on desired subrogation recovery level as output from the claims adjudication agent) are subrogated. The fraud detection agent uses a data set 1900 as shown in FIG. 19 and a data set 2000 as shown in FIG. 20 to predict fraud recovery at the claim level and entity level (payee, claimant, provider, third party, network etc.) using industry standard methods for predictive modeling. The fraud detection agent is also configured to use the data set 2000 of FIG. 20 to conduct outlier analysis at the entity level using industry standard outlier detection methods. The predictive model claim record scores, entity level predictive model scores and entity level outlier scores can all be aggregated (min, max, average, counts) to any entity level and an outlier detection analysis, using industry standard methods is conducted for each entity creating a combined fraud score. Entities with fraud scores exceeding a threshold (input to the agent) are passed on for standard insurance investigative processing.

The control server 210 (FIG. 2) is configured to autonomously manage the operational configuration and execution of the processes associated with the intelligent agent modules 802, 804 and 806, as described above. According to another aspect, the outputs generated by the intelligent agent modules is also delivered to the ERP 108 (FIG. 1) and/or to the other planning systems 240 in the enterprise computer system 204 (FIG. 2) to permit execution by transactions systems 110 (FIG. 1) over the Internet 206 and through the retailer firewall 260.

Figure 9A:
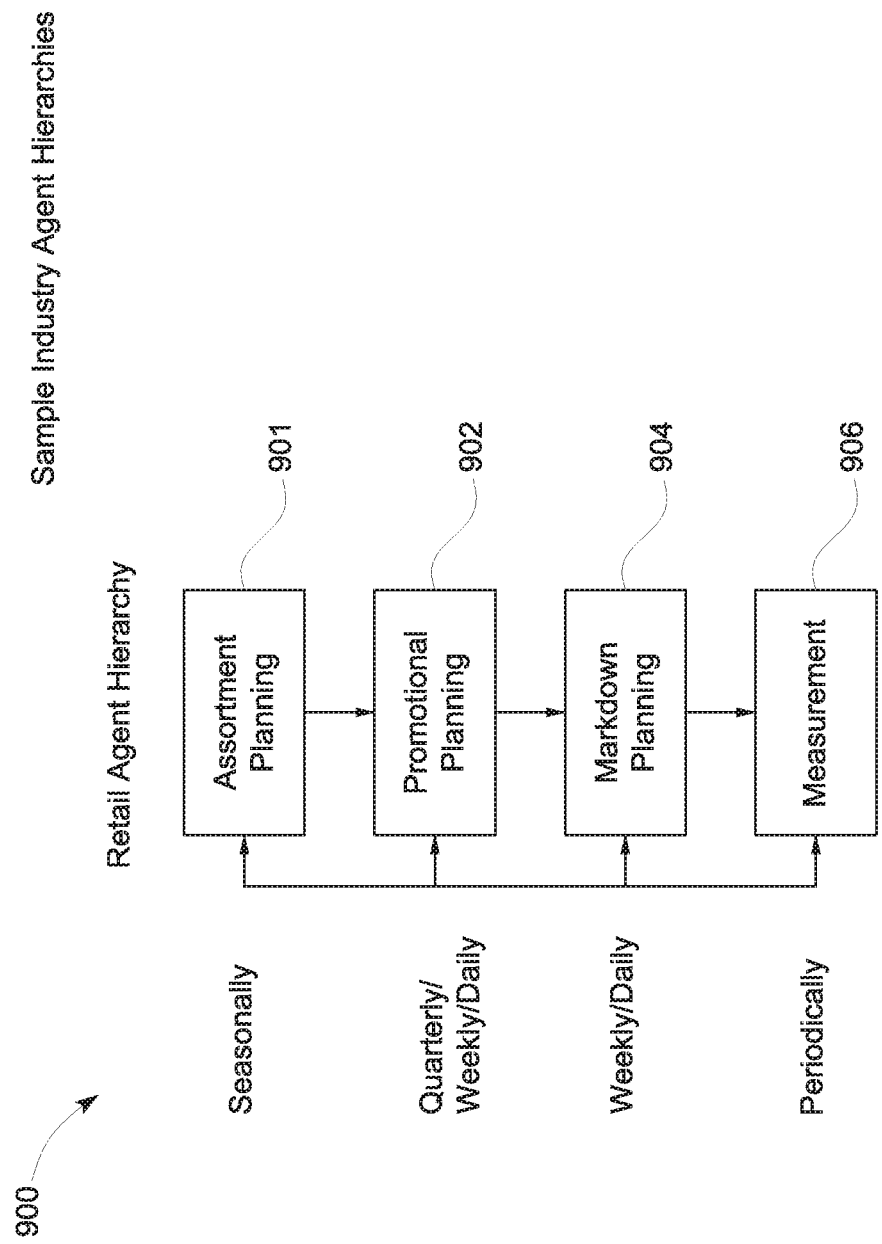
FIG. 9A shows in diagrammatic form an information or process flow hierarchy for an autonomous retail merchandise planning application for execution by the autonomous enterprise planning system of FIG. 1, according to an embodiment of the present invention.

Reference is next made to FIG. 9A, which shows a retail agent hierarchy according to an embodiment and indicated generally by reference 900. The retail agent hierarchy 900 defines the functional relationship and workflows between the intelligent agent modules for a retail enterprise application. As shown, the retail agent hierarchy 900 comprises an assortment planning function or workflow 901 at the first or highest level; a promotional planning function or workflow 902 at the second or next highest level; a markdown planning function or workflow 904 at the third level; and a measurement function or workflow 906 at the fourth or lowest level. According to an exemplary implementation, the quarterly/period assortment intelligent agent module 901 is executed on a seasonal basis. The quarterly/periodic assortment planning intelligent agent module 502 is configured at this level in the retail agent collaboration arrangement 500 in FIG. 5. According to an exemplary implementation, the promotional planning intelligent agent module 902 is executed on a quarterly/weekly basis. The promotional planning intelligent agent module 604 is configured at the second level 902 in the retail agent collaboration arrangement 600 in FIG. 6. According to an exemplary implementation, the markdown planning intelligent agent module 904 is executed on a weekly/daily basis. The markdown planning intelligent agent module 702 in the retail agent collaboration example in FIG. 7 is configured at the third level 904. According to an exemplary implementation, the measurement intelligent agent module 906 is executed on a periodic basis. The retail agent hierarchy 900 provides an autonomous merchandise planning function for a retailer or retail enterprise.

Figure 9B:
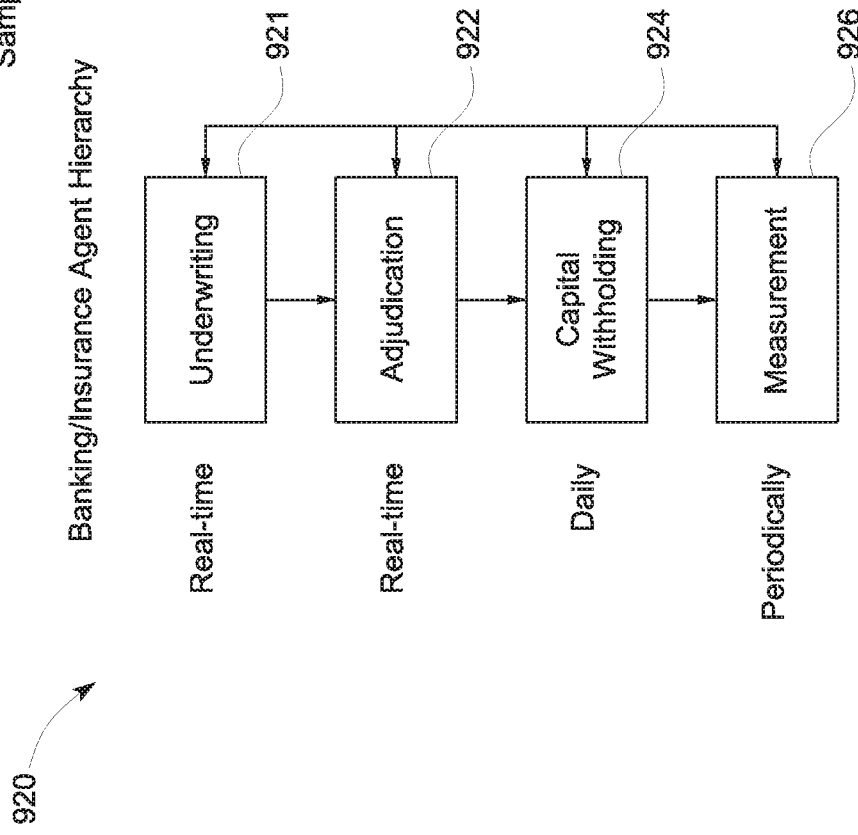
FIG. 9B shows in diagrammatic form an information or process flow hierarchy for an autonomous insurance underwriting and claims processing for execution by the autonomous enterprise planning system of FIG. 1, according to an embodiment of the present invention.

Reference is next made to FIG. 9B, which shows a banking/insurance agent hierarchy according to an embodiment and indicated generally by reference 920. The insurance agent hierarchy 920 defines the functional relationship and workflows between the intelligent agent modules for a banking or insurance enterprise application.

As shown, the banking/insurance agent hierarchy 920 comprises an underwriting function or workflow 921 at the first or highest level; an adjudication function or workflow 922 at the second or next highest level; a capital withholding function or workflow 924 at the third level; and a measurement function or workflow 926 at the fourth or lowest level. According to an exemplary implementation, the underwriting intelligent agent module 921 is executed on a real-time basis, for example, as described above for the intelligent agent module 802 in FIG. 8. According to an exemplary implementation, the adjudication intelligent agent module 922 is executed on a real-time basis, for example, as described above for the claims adjudication intelligent agent module 804 in FIG. 8. The capital withholding intelligent agent module 924 is executed on a daily basis and typically comprises the setting aside of capital by an insurance company as stipulated by financial regulations to cover credit, operations, or other risk factors. The measurement intelligent agent module 926 is executed on a periodic basis at the lowest level of the hierarchy.

It will be appreciated that the level of planning detail is determined by the frequency of execution. The lower the frequency, the lower the detail. For instance, in retail, if long term planning is at the department level, then weekly or daily planning will be at the sub-category or product level. Similarly, in finance for example, if real-time planning is at the transaction level, then daily planning will happen at the aggregate product level. Measurement occurs at the lowest level of detail and can be reported at any aggregation level.

Reference is made next to FIG. 10 which illustrates a planning cycle 1000 comprising higher level long term planning tasks and lower level more frequent planning tasks. As shown, the planning cycle 1000 comprises a highest level planning task 1002, and lower level planning tasks indicated by references 1004, 1006 and 1008, respectively. The highest level planning task 1002 typically occurs first in the planning cycle 1000, is applied to N periods, and generates a plan 1012 at a higher level of decision granularity, for example, a plan at the retail department 320 level (FIG. 3), and financial plans or insurance loss ratio by insurance line of business. The lower level planning tasks, on the other hand, have a lower level of granularity. According to another aspect and as shown, the lower level planning tasks 1004 can utilize the output of the highest level task 1002, i.e. the plan 1012. The output 1012 of the highest level plan 1002 provides constraints, or guidance parameters, and are executed more frequently applying to a single time period or smaller than N periods. In contrast, the higher or longer term plan 1012 is executed every N cycles of the shorter term plan. The lower level task 1004 also generates an output plan 1014. The output plans generated by the lower level plans are configured to be executed by the ERP 108 (FIG. 1) and other planning systems 103 (240, 250) to permit execution by transactions systems 106 over the internet 206 through insurer firewall 260. Sequences of lower level planning tasks 1005, 1007 are executed deliver plans 1006, 1007 to be executed sequentially by ERP and other planning systems 103 (240, 250) to permit execution by transactions systems 106 over the Internet 206 through insurer firewall 260. The higher level planning tasks utilize Equation (1) set up or configured at the department, sub-department or category level of the product hierarchy of FIG. 3. The output of Equation (1) will be a weekly (typically) number of promotional products to be selected for promotion by channel at whatever level the equation was set up at (department, sub-department or category). The promotional product selection agent will utilize this output as a constraint, which takes the following the form:

$$\sum_{i=1}^{L} x_i(t) < C \qquad \text{Equation (2)}$$

where L is less than n (from Equation (1)) and C is an integer constant.

Utilizing the sequence of solution vectors for a period of time $x_j(t_1)$ to $x_j(t_N)$ a promotion plan is generated for periods $t_1$ to $t_N$, at whatever level the Equation (1) was set up. To determine which products should be promoted weekly the product selection agent further uses Equation (3) as follows:

$$\pi = \sum_{r=1}^{L} [\sum_{j=1}^{N} \sum_{i=1}^{m(r)} (x_{ij} \Delta_{ij}(1+Y_{ij}\sigma_i)) - \sum_{i=1}^{m(r)} \{\sum_{k=1}^{P} \sum_{l=1}^{P} \Delta_{il}(1+y_{il}\sigma_i) x_{il} C_{ll'}^{ik} x_{il'}\}]$$

where, $x_{ij} \in \mathbb{I}$ in interval [0,1]; is the solution vector to be solved for indicating whether or not a product i is to be promoted on period j.

$y_{ij} \in \mathbb{I}$ in interval [0,1] and indicates preferential promotional placement with 0 indicating no preference and 1 being the most advantageous.

$\pi$=is the metric of interest being optimized (sales, gross margin or transactions)

$\sigma \in \mathbb{R} > 0$ $k \in \mathbb{I}$ which takes into account the duration of cannibalization between products being considered.

r is the category identifier m(r)=number of finelines in category r

P and N is the number of promo weeks considered

L is the number of categories $\Delta_{ij}$, $\sigma_i$ and $C_{ll'}^{ik}$ are all given and are the fineline increment, promotional elasticity, and cannibalization penalty respectively. All these terms are functions of time. The elements of $C_{ll'}^{ik}$ are fractions between [0,1] indicating the fraction of future sales cannibalized between product i and k.

Equation (3) is subject to the following constraints according to Equation (4)

$$\sum_{i=m}^{n} x_{ij} \leq \alpha \text{ for } j \in \{1, \ldots, N\}; \sum_{i=d}^{l} y_{ij} \leq \beta \text{ for } j \in \{1, \ldots, N\}$$

where, m, n and d, l are subranges of the vectors from 1 to N. The constraints are the solution to the Equation (1).

The assortment planning agent will use this output (when Equation (1) is set up as quarterly or annual) as a set of constraints of the form of Equation (2) when selecting the optimal quantity of each product and optimal regular prices that should be assorted in the retailer's stores which is solved for using Equation (1) with a lookup table of all products, prices, quantities, store and time periods. In this manner setting up the equations at a higher level of the product hierarchy of FIG. 3 provides plan outputs across many time periods which are the constraints of Equation 2.0 or 4.0 which is used to select more detailed products and prices at a lower level of the product hierarchy in a specific time period using Equation 1 and 3 as described above.

Reference is made next to FIG. 11 which shows in diagrammatic form common components comprising mathematical modules and common external sensory input modules for intelligent agent modules in a singular industry or application according to an embodiment of the present invention and indicated generally by reference 1100. In the context of retail enterprise or application, the intelligent agent modules comprise the following: (1) an intelligent agent module for quarterly/periodic assortment planning 1102; (2) an intelligent agent module for regular planning 1104; (3) an intelligent agent module for demand forecasting 1106; (4) an intelligent agent module for size/pack optimization for shipping 1108; (5) an intelligent agent module for quarterly product selection 1110; (6) an intelligent agent module for weekly promotion product selection 1112; (7) an intelligent agent module for promotional price selection 1114; (8) an intelligent agent module for inventory allocation 1116; (9) an intelligent agent module for weekly/daily markdown price selection 1118; (10) an intelligent agent module for inventory re-allocation 1102. The intelligent agent modules are configured to operate directly or hierarchically or that do not directly interact in the same industry, for instance, as described above. As also depicted in FIG. 11, the intelligent agent modules are configured to execute a common theoretical or mathematical model indicated by reference 1101, and utilize common sensory transactions inputs 102 (FIG. 1), as also described above. It will be appreciated that in order for the aggregate effect or result for the enterprise is to be positive, then the autonomously operating intelligent agent modules need to be operating or contributing to a common goal or objective. In addition, the effects of interactions between the intelligent agent modules need to be accounted for between all agents. The interaction effects are reflected, for instance, in the common theoretical or mathematical model and also in the collaborative workflow between the intelligent agent modules. The interaction terms are captured in Equation (1) described above and in the manner with how the agents interact as described above. As described above, the intelligent agent modules are configured to receive common sensory inputs from the external environment, for example, a retail enterprise. And as also described above, the intelligent agent modules are also configured to utilize the output of the intelligent agent modules.

Reference is made next to FIG. 12 which shows a statistical process control method according to an embodiment of the invention and indicated generally by reference 1200. According to another aspect, the autonomous planning system 100 is configured to determine when the outputs being generated are stable and when the outputs are unstable/invalid, and further comprises the functionality to self-correct. According to an embodiment, the autonomous planning system 100 is configured with statistical process control functions that are executed and applied to each piece of data collected by the intelligent agent modules, data that is modified by the intelligent agent modules 400 (FIG. 4) executing internal functions 412, 414 and 416 and features/coefficients in the common mathematical theory 418, any features of the intelligent agent policies 420 and the decisions made 440 in either the simulated or actual control loops as described above. In a typical application, there will be millions to billions of metrics, parameters and derived or calculated values associated with the operation of the autonomous planning system 100, for instance, the sensory input data values, the mathematical theory coefficients, the features or plans derived or generated from the sensory input data, and actions collectively referred to as metrics.

According to an embodiment, the statistical process control method 1200 comprises graphing the value of a measure 1201 over a number of executions 1202 of the statistical process control method 1200. For deterministic process steps, the measures are collected over different executions at different times. For stochastic process steps, the measures are collected for executions at the same or different times. A statistical analysis is applied to derive an upper control limit (UCL) 1203, a statistical mean 1205 and a lower control limit (LCL) 1207, as depicted in FIG. 12. The statistical mean 1205 is the centre line of a specific metrics' control chart, the Upper Control Limit (UCL) 1203 and the Lower Control Limit (LCL) 1207 are selected to be outlier limits beyond which the output of the system is at risk of being unstable/invalid. The upper 1203 and lower 1207 control limits are determined by executing the simulation loop, for instance, the simulated system loop 460 (FIG. 4), and ensuring output values or actions fall within a desired range of known or historical values. As also shown, an upper warning limit 1204 and a lower warning limit 1206 are generated and defined within the outlier limits 1203, 1207 and provide warning that operation of the autonomous enterprise system 100 may be trending toward failure or instability. Confidence or stability of the system is determined based on the number and/or distribution of monitored metrics that fall within the warning limits 1204, 1206, between the warning limits 1204, 1206 and the control limits 1203, 1207, and outside the control limits 1203, 1207.

The statistical control limits can be aggregated using simple averaging, weighted averaging etc. from detailed planning agents, to workflows to hierarchies to provide control charts at different levels of system operation. It will be appreciated that the higher level statistical process control values would be more closely related to an unstable output 440 from the intelligent agent module 400 (FIG. 4) than individual agent metrics charts. The control server 210 (FIG. 2) is configured to the interpret the statistical process control values (i.e. charts) and autonomously execute corrective operations or functions when the warning limits 1204 or 1206 are reached and/or the upper control limit 1203 or the lower control limit 1207 are approached. According to another aspect, the charts generated by the statistical process method may also be made available for viewing by human operators as the metrics are tracked in the data warehouse server 212, reporting server 218 and web server 214 (FIG. 2).

Figure 13:
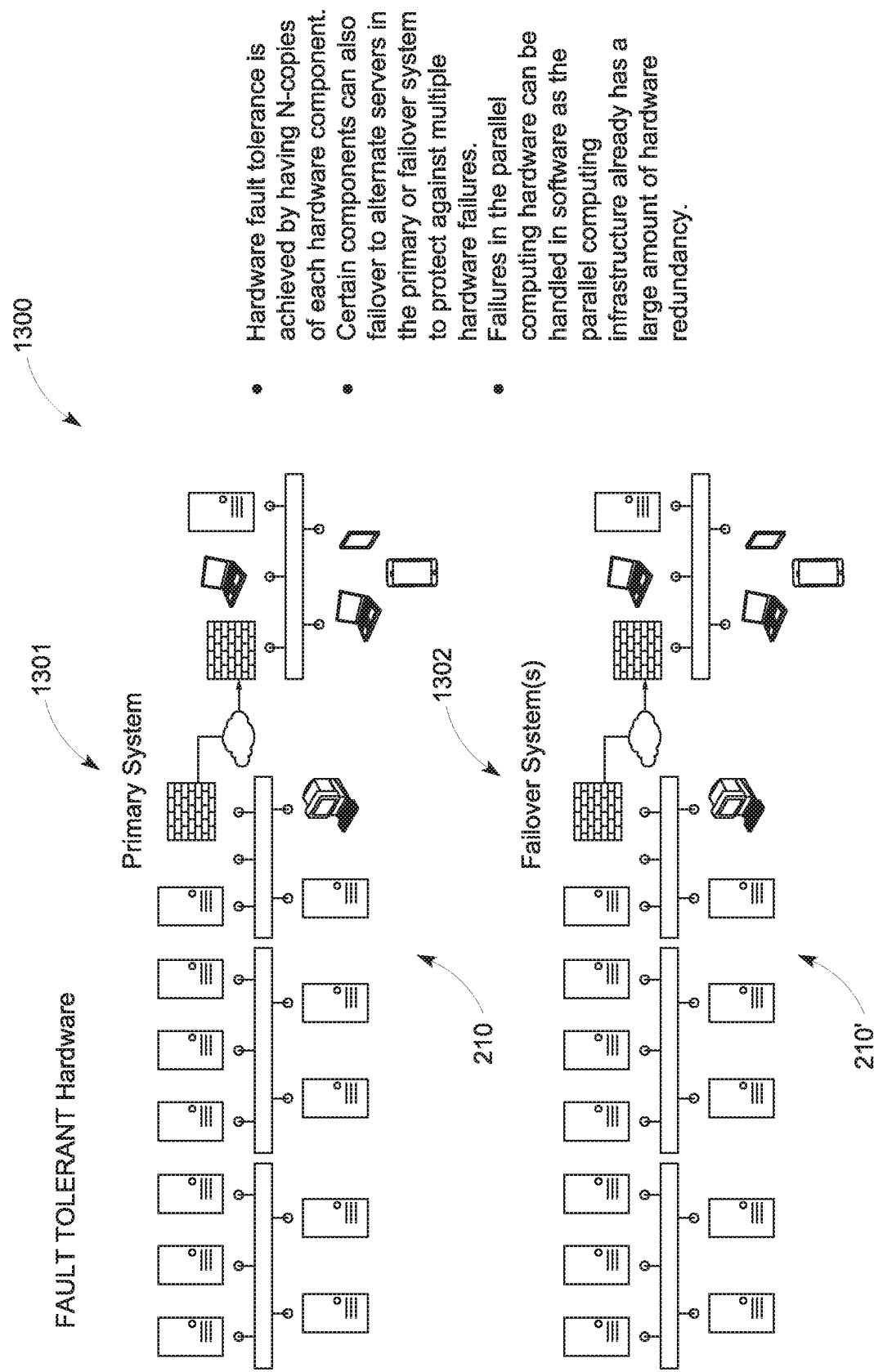
FIG. 13 shows in diagrammatic form a fault tolerant hardware configuration of the autonomous enterprise planning system of FIG. 1 according to an embodiment of the present invention.

Reference is made next to FIG. 13, which illustrates a fault tolerant hardware configuration or architecture 1300 for the computer hardware infrastructure 200 (FIG. 2) comprising the autonomous enterprise system 100. According to an embodiment, the fault tolerant hardware architecture 1300 comprises a primary hardware infrastructure 1301 corresponding to the autonomous enterprise planning system 200 (FIG. 2), and one or more multiple or duplicate copies of the autonomous enterprise planning system 200 (FIG. 2) indicated by reference 1302 in FIG. 13. The fault tolerant hardware architecture 1300 provides hardware fault tolerance by having N-copies of each hardware component in the system. In the autonomous planning system 200 (FIG. 2), some hardware components already have built-in fault tolerance, for instance, the parallel computing servers 220 can implemented with redundant components.

According to an exemplary implementation, the primary control server 210 (FIG. 2) in primary infrastructure 1301 is configured to determine when to failover to a redundant system or component. In case of failure of the control server 210 in the primary system 1301, the control server 210' in the secondary infrastructure 1302 is configured to monitor the primary control server 210 and take over control should the primary control server 210 in the primary system 1301 fail.

Figure 14:
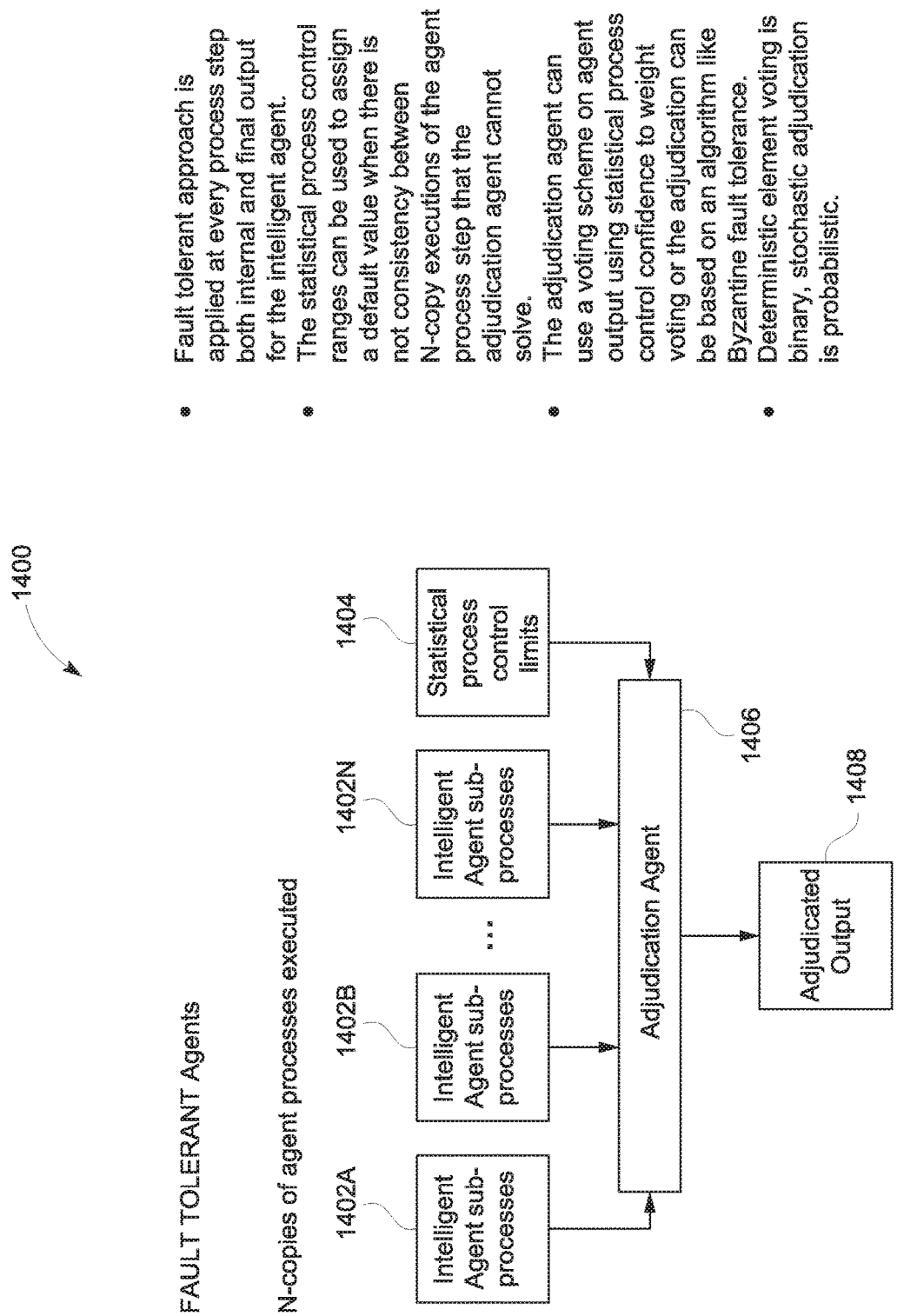
FIG. 14 shows in diagrammatic form the information flow between and statistical process control with an adjudication agent to achieve fault tolerant agent execution according to an embodiment of the present invention.

Reference is made to FIG. 14, which shows a fault tolerant mechanism for the operation of the intelligent agent modules 400 (FIG. 4) according to an embodiment of the present invention, and indicated generally by reference 1400. The fault tolerant configuration 1400 comprises independently executing the processes/operations associated with an intelligent agent module to generate N execution (workflow and hierarchy) results 1402, indicated individually by references 1402a, 1402b . . . 1402N, of the intelligent agent module, as depicted in FIG. 14, and applying a statistical process control function 1404. The statistical process control function 1404 is executed for each of the N execution results 1402. The fault tolerant mechanism further includes an adjudication agent indicated by reference 1406. The adjudication agent 1406 is configured using the intelligent agent architecture 400 (FIG. 4) The input sensors 410 of the adjudication agent 1406 collect each of the outputs or execution results 1402 for the intelligent agent module, for instance, at each sub-process step. The adjudication agent 1406 also collects the output of the statistical process control module 1404. According to an exemplary implementation, the adjudication agent is configured to execute a voting scheme in order to choose the most frequently occurring output to ensure that there is agreement between multiple executions of the same sub-process step or some fault tolerant algorithm like Byzantine fault tolerance to choose the correct output, indicated by reference 1408. If the adjudication agent 1406 is unable to determine the correct course of action, the output from the statistical process control module 1404 is used as a default, i.e. safe, output by choosing a value, for instance, within the control limits as described above with reference to FIG. 12.

Figure 15:
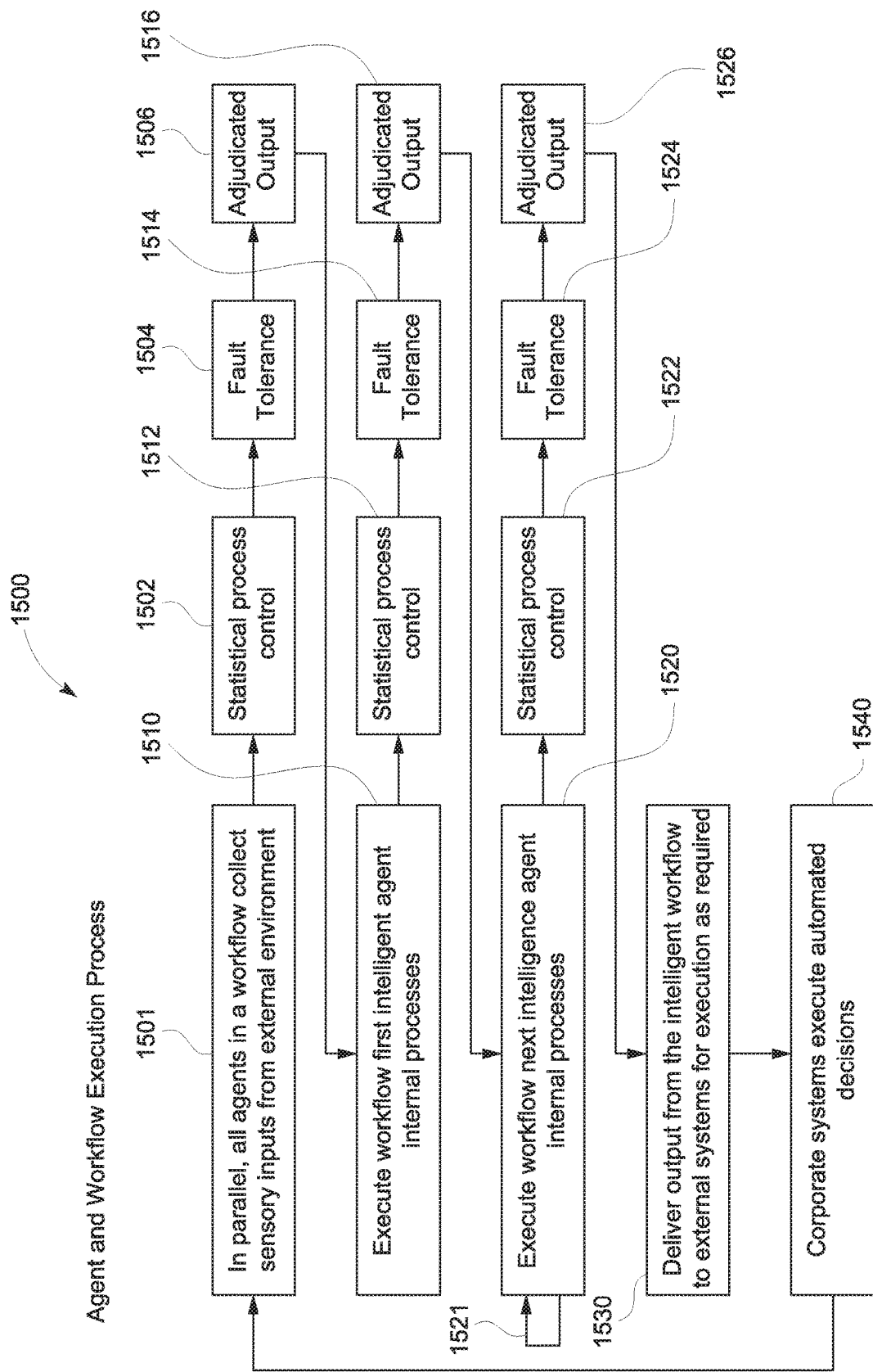
FIG. 15 shows in diagrammatic form an agent and workflow execution process flow for the autonomous enterprise planning system of FIG. 1, according to an embodiment of the present invention.

Reference is made next to FIG. 15, which shows an agent and workflow execution process flow for the autonomous enterprise system 100 (FIG. 1) according to an embodiment of the present invention. According to an exemplary implementation, the administrative console 213 (FIG. 2) is utilized to configure the control server 210 which starts the first process step 1501 with the intelligent agent modules 400 executing on the servers 205-209, and collecting sensory inputs 410 (FIG. 4) from the client enterprise system 240 via the Internet 206 through the VPN firewall 230 and are processed by the ETL server 216 and stored in the data warehouse server 212.

Next statistical process control data is collected for each process step 1502 and multiple copies (3 or more) of each the processes are executed in by the fault tolerance module 1402 (FIG. 14) in step 1503. The outputs of each process step are fed to the adjudication agent 1406 (FIG. 14) to create adjudicated outputs 1504 which are fed into a hierarchical workflow, for example, 900 or 920 in FIG. 9, or to the first intelligent agent of one of the specific workflow examples described above in FIGS. 6 to 8, as indicated by reference 1510. Statistical process control data is collected for each process in step 1512 and multiple copies (3 or more) of each of the processes are executed 1514. The outputs of each process step are fed into the adjudication agent 1406 to create adjudicated output at step 1516. The adjudicated output is then fed into the next step of the appropriate hierarchy, or workflow, as indicated by step 1520. The same flow of statistical process control is executed for each process in step 1522, and then 3 or more fault tolerant process copies are executed in step 1524. The outputs of these are fed into the adjudication agent 1406 to create an adjudicated output in step 1526 which is fed into the next step of the process and repeated 1521 until the workflow is completed. The final system adjudicated outputs are delivered in step 1530 over the internet 206 (FIG. 2) through the VPN firewall 260 to the enterprise operational systems 240 to be executed, as indicated by step 1540, on the transaction processing systems 250 (FIG. 2) with data collected to the transaction databases 114 (FIG. 1) to start the process executing again autonomously 102 (FIG. 1) better than current performance, without fatigue, in a stable, fault tolerant manner freeing enterprise resource to focus on other activities which are not data driven.

The present invention may be embodied in other specific forms without departing from the spirit or essential characteristics thereof. Certain adaptations and modifications of the invention will be obvious to those skilled in the art. Therefore, the presently discussed embodiments are considered to be illustrative and not restrictive, the scope of the invention being indicated by the appended claims rather than the foregoing description, and all changes which come within the meaning and range of equivalency of the claims are therefore intended to be embraced therein.

What is claimed is:

1. A method for autonomously operating an enterprise infrastructure comprising an adjudication agent, a primary control server, and a secondary control server, the method comprising:
   receiving, at a first intelligent agent of the primary control server and at a second intelligent agent of a secondary control server, a plurality of sensor inputs, the plurality of sensor inputs received from an external enterprise system;
   determining, at the first intelligent agent, a first correction of measurement noise to a first simulated state of the first intelligent agent using the plurality of sensor inputs, and at the second intelligent agent, a second correction of the measurement noise to a second simulated state of the second intelligent agent using the plurality of sensor inputs;
   determining, based on the first and second corrections, a first next stable action at the first intelligent agent, and a second next stable action at the second intelligent agent;
   generating, at the adjudication agent, by a statistical control function, statistical process control data comprising one or more control limits, the one or more control limits selected to ensure that performance of the first next stable action of the first intelligent agent and the second next stable action of the second intelligent agent fall within a desired range of historical values;
   receiving, at the adjudication agent, the first next stable action from the first intelligent agent and the second next stable action from the second intelligent agent;
   applying, at the adjudication agent, the one or more control limits to the first next stable action and the second next stable action of each of the first intelligent agent and the second intelligent agent;

determining, at the adjudication agent, an adjudicated next stable action by selecting a most frequently occurring next stable action amongst a plurality of next stable actions from a plurality of intelligent agents, the plurality of next stable actions including the first next stable action and the second next stable action, and the plurality of intelligent agents including the first intelligent agent and the second intelligent agent; and autonomously performing the adjudicated next stable action by a process control server in the enterprise infrastructure.

2. The method of claim 1, wherein the determining the adjudicated next stable action further comprises applying a Byzantine fault tolerance algorithm to the respective next stable actions of the first intelligent agent and the second intelligent agent.

3. A system for autonomously operating an enterprise infrastructure, comprising:
- a primary control server, the primary control server comprising:
  - a memory comprising:
    - a first intelligent agent comprising:
      - a first simulated state; and
      - a first next stable action;
  - a processor configured to:
    - receive a plurality of sensor inputs, the plurality of sensor inputs received from an external enterprise system;
    - determine a correction of measurement noise to the first simulated state using the plurality of sensor inputs; and
    - determine the first next stable action based on the correction of the measurement noise to the first simulated state;
- a secondary control server, the secondary control server comprising:
  - a memory comprising:
    - a second intelligent agent, comprising:
      - a second simulated state; and
      - a second next stable action;
  - a processor configured to:
    - receive the plurality of sensor inputs, the plurality of sensor inputs received from the external enterprise system;
    - determine a correction of the measurement noise to the second simulated state using the plurality of sensor inputs; and
    - determine the second next stable action based on the correction of the measurement noise to the second simulated state;
- an adjudication server in network communication with the first control server and the second control server, the adjudication server comprising:
  - a memory comprising:
    - an adjudication agent, comprising:
      - an adjudicated next stable action; and
      - statistical process control data;
  - a processor configured to:
    - generate, by a statistical control function, the statistical process control data comprising one or more control limits, the one or more control limits selected to ensure that performance of the first next stable action of the first intelligent agent and the second next stable action of the second intelligent agent fall within a desired range of historical values;
    - receive, at the adjudication agent, the first next stable action from the first intelligent agent at the primary control server, and the second next stable action from the second intelligent agent at the secondary control server;
    - apply the one or more control limits to the first next stable action of the first intelligent agent and the second next stable action of the second intelligent agent;
    - determine the adjudicated next stable action by selecting a most frequently occurring next stable action among a plurality of next stable actions, the plurality of next stable actions comprising the first next stable action and the second next stable action, and the plurality of intelligent agents comprising the first intelligent agent and the second intelligent agent; and
- a process control server in the enterprise infrastructure, the process control server comprising:
  - a processor configured to:
    - autonomously perform the adjudicated next stable action.

4. The system of claim 3, wherein the processor of the adjudication server is further configured to determine the adjudicated next stable action by further applying a Byzantine fault tolerance algorithm to the respective next stable actions of the first intelligent agent and the second intelligent agent.

* * * * *